(12) United States Patent
Svendsen et al.

(10) Patent No.: US 9,080,890 B2
(45) Date of Patent: Jul. 14, 2015

(54) METHOD AND SYSTEM FOR OBTAINING DESTINATION INFORMATION FROM PROXIMATE DEVICES BASED ON TIME AND HEADING INFORMATION

(75) Inventors: Hugh Svendsen, Chapel Hill, NC (US); Kunal Kandekar, Jersey City, NJ (US)

(73) Assignee: Modena Enterprises, LLC, Wilmington, DE (US)

( * ) Notice: Subject to any disclaimer, the term of this patent is extended or adjusted under 35 U.S.C. 154(b) by 727 days.

(21) Appl. No.: 13/290,629

(22) Filed: Nov. 7, 2011

(65) Prior Publication Data
US 2012/0208559 A1    Aug. 16, 2012

Related U.S. Application Data

(60) Provisional application No. 61/410,580, filed on Nov. 5, 2010.

(51) Int. Cl.
*H04M 3/42* (2006.01)
*H04W 24/00* (2009.01)
*G01C 21/36* (2006.01)

(52) U.S. Cl.
CPC .......... *G01C 21/362* (2013.01); *G01C 21/3611* (2013.01)

(58) Field of Classification Search
CPC ........................ H04W 4/02; H04L 29/08657
USPC ............ 455/414.1, 414.2, 456.1–456.3, 457; 340/988, 995.1, 955.19, 995.2, 340/995.21–995.24; 701/426, 424, 438, 701/400, 487, 526, 540
See application file for complete search history.

(56) References Cited

U.S. PATENT DOCUMENTS

| | | | |
|---|---|---|---|
| 6,633,809 B1 * | 10/2003 | Aizono et al. | 701/454 |
| 7,835,859 B2 * | 11/2010 | Bill | 701/424 |
| 2009/0092042 A1 * | 4/2009 | Yuhara et al. | 370/216 |
| 2009/0157615 A1 * | 6/2009 | Ross et al. | 707/3 |
| 2009/0171574 A1 * | 7/2009 | Ishibashi et al. | 701/209 |
| 2010/0179750 A1 * | 7/2010 | Gum | 701/201 |
| 2011/0125514 A1 * | 5/2011 | Molaison | 705/2 |
| 2011/0183627 A1 * | 7/2011 | Ueda et al. | 455/67.11 |
| 2011/0238289 A1 * | 9/2011 | Lehmann et al. | 701/201 |
| 2011/0252061 A1 * | 10/2011 | Marks et al. | 707/771 |
| 2013/0066880 A1 * | 3/2013 | Schramm et al. | 707/743 |

\* cited by examiner

*Primary Examiner* — Dung Hong

(57) ABSTRACT

Methods and systems of operating a personal navigation device (PND) are disclosed. In particular, the methods and systems allow for the PND to obtain location data for each of one or more destinations from a destination source device over a wireless network link. In one embodiment, the destination source device is a server computer on a network or a mobile communications device (MCD) that is in proximity with the PND.

33 Claims, 16 Drawing Sheets

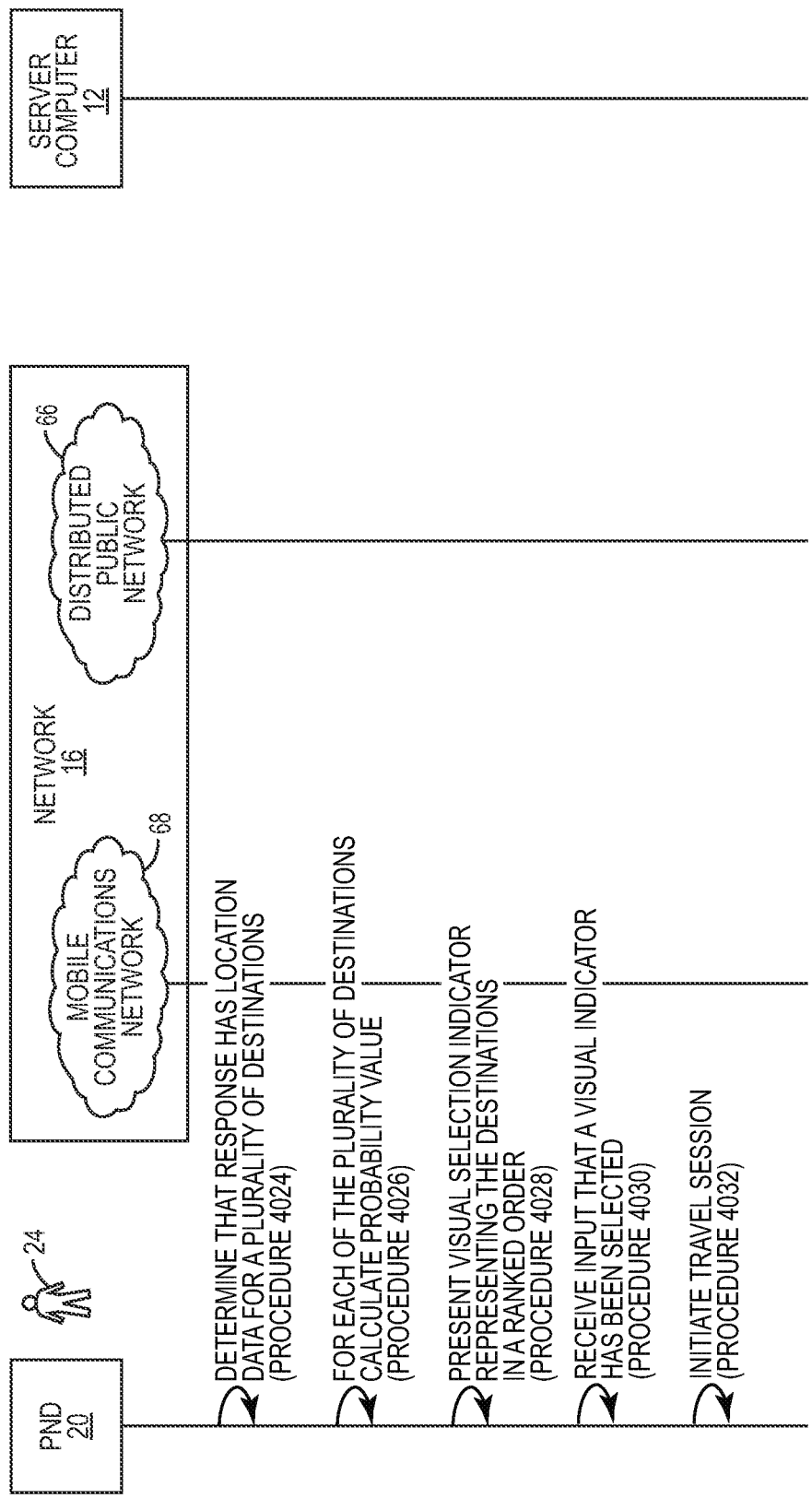

METHOD AND SYSTEM FOR OBTAINING DESTINATION INFORMATION FROM PROXIMATE DEVICES BASED ON TIME AND HEADING INFORMATION

RELATED APPLICATIONS

This application claims the benefit of provisional patent application Ser. No. 61/410,580, filed Nov. 5, 2010, the disclosure of which is hereby incorporated herein by reference in its entirety.

FIELD OF THE DISCLOSURE

This disclosure relates generally to systems and methods of obtaining destinations for personal navigation devices.

BACKGROUND

Looking up location information to enter a destination into a personal navigation device (PND) can be cumbersome. Often this information is found in other devices and thus a user is required to manipulate the other device and the PND in order to enter in the information. This can be particularly dangerous when driving. Increasingly, communities and insurance companies are becoming more and more aware of the dangers of distracted driving.

Accordingly, there is a need for being able to more easily and safely use the location information from other devices as destinations for the PND.

SUMMARY

This disclosure relates to methods and systems of operating a personal navigation device (PND). In particular, the methods and systems allow for the PND to obtain location data for each of one or more destinations from a destination source device over a wireless network link. In one embodiment, the location data for the destinations is received from personal information records, such as contact records, emails, calendar records, web browser history, and/or the like. The destination source device may be a server computer on a network or a mobile communications device (MCD) that is in proximity with the PND.

To receive location data from the destination source device, the PND transmits a destination request to the destination source device from the PND over the wireless network link. As a result, the destination source device may generate a response to the destination request that has the location data for each of one or more destinations. The location data may come from the personal information records stored or managed by the destination source device. The PND then receives the response to the destination request over the wireless network link.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure:

FIGS. 7A and 7B illustrates communication flow diagrams for implementing one embodiment of the exemplary procedures shown in FIG. 3 where the destination source device is the server computer shown in FIG. 1;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

This disclosure relates to methods and systems of operating a personal navigation device (PND). In particular, the methods and systems allow for the PND to obtain location data for each of one or more destinations from a destination source device over a wireless network link. In one embodiment, the location data for the destinations is received from personal information records, such as contact records, emails, calendar records, a web browser history, and/or the like. The destination source device may be a server computer on a network or a mobile communications device (MCD) that is in proximity with the PND.

To receive location data from the destination source device, the PND transmits a destination request to the destination source device from the PND over the wireless network link. As a result, the destination source device may generate a response to the destination request that has location data for each of one or more destinations. The location data may come from the personal information records stored or managed by the destination source device. The PND then receives the response to the destination request over the wireless network link.

Figure 1:
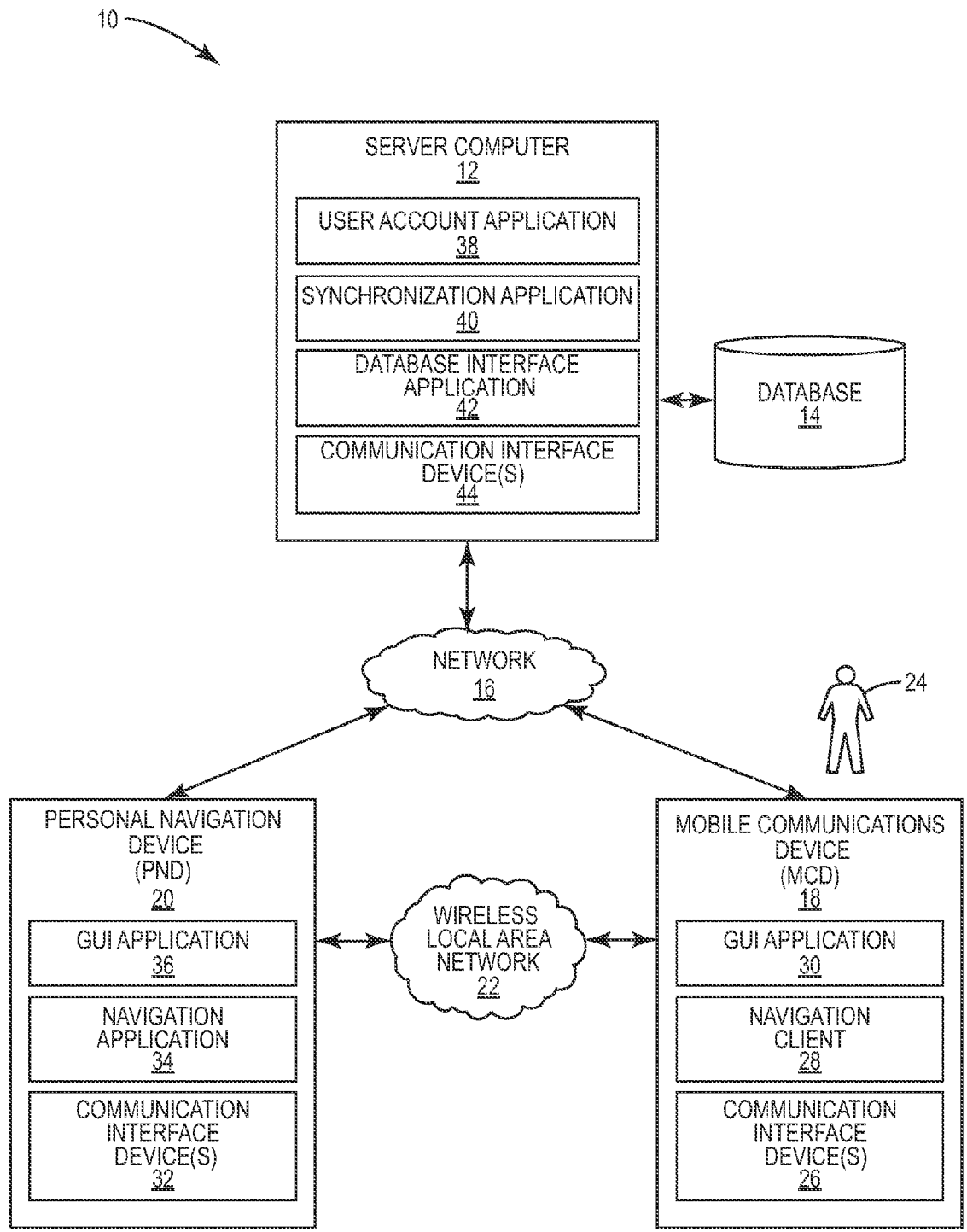
FIG. 1 illustrates one embodiment of a system in which a personal navigation device (PND) receives location data for destinations from a mobile communication device (MCD) and/or a server computer.

FIG. 1 illustrates one embodiment of a system 10 in accordance with this disclosure. In this embodiment, the system 10 comprises a server computer 12, a database 14, a network 16, a MCD 18, and a PND 20. The MCD 18 and the PND 20 may be communicatively coupled to the server computer 12 through the network 16. The network 16 may be any type of network or any combination of networks. For example, the network 16 may include a distributed public network such as the Internet, one or more local area networks (LAN), one or more mobile communication networks, and/or the like. If the network 16 includes various types of networks, the network may include gateways, or the like, to permit communication between the different networks. Also, the network 16 may include wired components, wireless components, or both wired and wireless components.

The MCD 18 may be any type of user device capable of providing the desired functionality in order to implement a particular embodiment of the system 10. For example, the MCD 18 may be a mobile smart phone, portable media player device, mobile gaming device, tablet, handheld computer, laptop, and/or the like. Some exemplary MCDs 18 that may be programmed or otherwise configured to operate in accordance with this disclosure are the Apple® iPhone, Apple® iPad, Apple® iPod Touch® device, a smart phone programmed to have Google's Android operating system, Palm Pre, Samsung Rogue, and Blackberry Storm. Note, this listing is simply illustrative and is not intended to limit the scope of the present disclosure.

The PND 20 may be any type of personal navigation device capable of providing the desired functionality in order to implement a particular embodiment of the system 10. The PND 20 may be a dedicated PND such as a dedicated global positioning system (GPS) personal navigation device, an automotive GPS navigation device, and/or the like. Some exemplary PNDs 20 that may be programmed or otherwise configured to operate in accordance with this disclosure are the Navman MY and S model family devices, TomTom GO, Rider, ONE family devices, Garmin iQue, StreetPilot, Nuvi, 1000 series, 2000 series, and 3000 series family of devices, Magellan RoadMate, Maestro, eXplorist, and Triton family of devices, and/or the like. Note, this listing is simply illustrative and is not intended to limit the scope of the present disclosure.

The MCD 18 and the PND 20 may connect to the network 16 through a wireless network connection such as Wi-Fi or any type of wireless mobile communications connection (e.g., 3G or 4G telecommunications connections such as GSM, LTE, W-CDMA, or WiMAX connections), and/or the like. Furthermore, the MCD 18 and the PND 20 are each operable to connect to one another via wireless local area networking link and form a wireless local area network, such as an ad-hoc network 22. Some examples of wireless local area networking services that may be provided by the MCD 18 and the PND 20 are Wi-Fi networking services, IEEE 802.11 networking services, Bluetooth networking services, ZigBee networking services, Z-Wave networking services, Infrared Data Association networking services, Near Field Communication services, and/or the like. Although not illustrated in FIG. 1, the PND 20 also may be operable to establish a satellite link in order to receive location position data, such as GPS location data, and/or the like. The communication interface devices 44 of the PND 20 may also include terminals, such as USB terminals, media ports, charger cable terminals, and/or the like, to allow the PND 20 to establish wired networking links. For example, if the PND 20 is the dash of a vehicle the PND 20 may be able to establish a wired network link with the MCD 18 through these terminals and obtain location data for destinations.

FIG. 1 illustrates both the MCD 18 and the PND 20 as being associated with a user 24. In other words, the MCD 18 and the PND 20 may be registered to the user 24, the user 24 may have an account on the MCD 18 and the PND 20, and/or the MCD 18 and the PND 20 may be otherwise assigned to the user in any other manner such that the MCD 18 and the PND 20 is identified as being utilized by the user. In alternative embodiments, the MCD 18 may be associated with one user while the PND 20 is associated with another user.

The MCD 18 and the PND 20 are shown in FIG. 1 as implementing various software applications. The software applications for the MCD 18 include one or more communication interface devices 26, a navigation client 28, and a graphical user interface (GUI) application 30. The PND 20 includes one or more communication interface devices 32, a navigation application 34, and a GUI application 36. The communication interface devices 26 of the MCD 18 and the communication interface devices 32 of the PND 20 are configured to allow the MCD 18 and the PND 20 to connect to the network 16 and to the ad-hoc network 22 through their respective communication interface devices. In addition, the communication interface devices 32 of the PND 20 may be operable to allow the PND 20 to establish a satellite link. For example, the communication interface devices may include a GPS receiver, and/or the like. Since the MCD 18 and the PND 20 may be operable with a variety of different networks and with a variety of different communication interface devices, the particular characteristics of the communication interface devices 26 and the communication interface devices 32 may vary. This may depend on the communicative features and functionality provided by particular embodiments of the MCD 18 and the PND 20. The GUI application 30 of the MCD 18 and the GUI application 36 are each operable to present a GUI to the user 24. The GUI applications 30 and 36 may be operable to present visual selection indicators to the user 24 so that the user 24 can initiate the various software applications on the MCD 18 and PND 20, provide user input, and otherwise interact with the functionality provided by the MCD 18 and the PND 20.

In this embodiment, the navigation application 34 may be operable with GUI application 36 to present the user 24 with a map of a geographic area. The navigation application 34 may also be operable to implement a travel session for the user. During a travel session, the navigation application 34 provides travel directions to the user 24 in order to reach a travel destination. The navigation application 34 may be operable determine the travel directions based on map data records stored on the navigation application 34, and/or from map data records retrieved from a map server (not shown) via the network 16. These travel directions may be provided to the user 24 through speech automation, by presenting text to the user 24, and/or through graphical indicia. Also, the navigation client 28 may be operable with the GUI application 36 to present a visual indicator to represent a location of the PND 20 on the map and various types of visual selection indicators in order to receive user input for the travel session and otherwise control the PND 20. Furthermore, the navigation application 34 may be operable to convert different types of location data into other types of location data. For example, if address data or a building name is provided for a destination, the navigation application 34 may be operable to convert the address data into location position data, and vice-versa. Location position data is any type of location data that indicates a geographic location using coordinates for a two-dimensional coordinate system or three-dimensional coordinate system. For example, the location position data may be GPS location data and/or the like. In addition, the navigation application 34 may be operable to generate destination requests. The destination requests are requesting destinations from the server computer 12 and the MCD 18. The responses to the destination requests include the location data indicating one or more destinations. Utilizing the location data, a travel session can be initiated using one of the destinations from the response as the travel destination for the travel session.

The navigation client 28 on the MCD 18 is operable to handle the destination requests from the navigation application 34. The navigation client 28 then searches internal records stored on the MCD 18. For example, the MCD 18 may be operable to provide a variety of different types of software applications that relate to the user 24, such as email software for an email account, calendar applications for personal appointments, contact applications for organizing and utilizing information relating the user's contacts, web browsers for accessing web sites that allow the user 24 search for information of interest and/or the like. As a result, the MCD 18 may store personal information records associated with the user 24, such as calendar records, emails, contact records, a web browser history, which may include content in a web browser cache, and/or the like. The navigation client 28 is operable to receive a destination request to search one or more of the personal information records. Since personal information records, such as emails and the web browser history are not generally configured to specifically partition location data from other data in the personal information record, the navigation client 28 may include functionality for recognizing the location data in the particular type of personal information record. As an example, text data in personal information records may be parsed and analyzed using Natural Language Processing methods such as tokenization, chunking, part-of-speech tagging (to classify words as nouns, verbs, adjectives and the like), and named entity recognition (to classify nouns as person, places, organizations or things). This information may then be filtered to extract words that are identified as places, and provide them as location data for responses to destination requests.

Referring again to FIG. 1, FIG. 1 also illustrates an embodiment of the server computer 12. The server computer 12 includes various software applications including a user account application 38, a synchronization application 40, a database interface application 42, and one or more communication interface devices 44. Note that in this embodiment, a single server computer 12 provides the user account application 38, a synchronization application 40, and the database interface application 42. Also, in this embodiment, the server computer 12 operates directly with the database 14, which is also located at the same network location as the server computer 12, for instance, in a data center. This is not necessarily the case. In alternative embodiments, some or all of these software applications may be provided by different server computers operating cooperatively. The server computers may be located either at the same network location or at various different network locations distributed throughout the network 16. Each server computer 12 may include a database interface application 42 and communication interface devices 44.

In FIG. 1, the database 14 stores database records, which include user accounts, including the user account of the user 24. The server computer 12 may forward information to the database 14 for storage in the database records and may also send information from the database records to the MCD 18 and the PND 20 through the network 16. The PND 20 may be provided with a networking address of the server compute 12 as well as credentials to authenticate itself with the server computer 12 in order to access personal information records of the user 24. The PND 20 may be configured to operate with any type of server computer 12 that maintains user accounts. However, in this embodiment, the server computer 12 is configured as a personal information server. The personal information server provides the user 24 with a centralized manner of storing personal information records. For example, the user 24 may be associated with various user devices (not shown) and have various user accounts on different server computers (not shown) on the network 16. On each of these user devices and user accounts, the user 24 may have personal information records. In this case, the user 24 may have an email account that is operated through the MCD 18 and another that is operated through another server computer on the network 16. In addition, the user 24 may keep calendar records on the MCD 18 and other calendar records on a personal desktop computer. The server computer 12 in this embodiment may be configured to receive the personal information records from all the various user devices and store them under the user account of the user 24 as database records in the database 14.

The user account application 38 of the server computer 12 is operable to manage access to the server computer 12 and the user accounts on the database 14. To provide access to the server computer 12, the user account application 38 may execute a log-in process that authenticates the user 24 with the server computer 12. For example, the log-in process may be performed using credentials entered by the user 24 or stored from pervious log-ins, such as a username and password. Once authenticated, the MCD 18 and the PND 20 obtain access to the user account. In this embodiment, the personal information records of the user 24 are stored under the user account as database records. The personal information records may include calendar records, contact records, emails, web browser history, and/or the like. They may also include user preferences such as describing privacy settings for accessing the personal information records in the user account, configurations for handling destination requests from the navigation application 34, configurations for handling alerts for appointments from the calendar records, configurations for handling alerts for relaying emails to different user devices, configurations for relevant web sites in the web browser history and/or the like. Profile information may also be stored in the user account on the database 14. The profile information may include the device identification data identifying the devices associated with the user 24, such as the MCD 18, user credentials (e.g., username and password), status information, and/or the like. User content may also be stored under the user account, such as pictures, movies, clips, songs, internet links, and/or the like.

In the illustrated example, the database 14 is programmed to store all of the given information for a particular user account in a single database record. However, in alternative embodiments, various different databases may store the personal information records, the user preferences, the profile information, and the user content throughout the network 16. The user account may simply be a centralized account that includes network locations for all the different information. The user account may include a database link to the database record of another database in order to find the information. Furthermore, the database 14 may be structured to maintain database records in accordance with defined database tables, classes or objects in which the information for each user 24 is at least partially distributed among various database records. Accordingly, the user profile may thus be a user database record having pointers (or pointer-to-pointers) that point to memory locations associated with other database records that actually store the information for the particular user account.

The synchronization application 40 is operable to allow the server computer 12 to synch with the user devices of the user 24. In this manner, the server computer 12 can receive the personal information records from the various user devices, such as the MCD 18. The database interface application 42 is operable to provide the server computer 12 with the ability to interface with the database 14. The database interface application 42 of FIG. 1 has been configured to handle destination requests from the navigation application 34 on the PND 20. Database queries may be generated by the database interface application 42 in order to search one or more of the personal information records under the user account. Since personal information records, such as emails and the web browser history are not generally configured to specifically partition location data from other data in the personal information record, the navigation client 28 may include functionality for recognizing the location data in the particular type of personal information record.

The communication interface devices 44 operate to allow the server computer 12 to connect to the network 16. Since the network 16 may be composed of various different types of networks, the communication interface devices 44 may be designed to operate with one or more different types of networks. For example, if the server computer 12 is an Internet protocol (IP) based server, the communication interface devices 44 may be designed to work with a communication interface device that permit the server computer 12 to send and receive TCP/IP packets over the Internet. In addition, the communication interface devices 44 may also allow the IP based server to communicate with gateways so that the IP based server can connect to the gateways for receiving information on a mobile communications network.

It should be noted that embodiments of different devices, such as the server computer 12 and the MCD 18, are described throughout this disclosure as using software applications to provide certain functionality. As is apparent to one of ordinary skill in the art, any system that can be implemented with software applications has a hardware circuit analog that utilizes hardware circuits specifically configured to provide the same functionality as the software application. Accordingly, this disclosure does not intend to limit the devices described herein to the utilization of software applications to provide the necessary functionality. Instead, the systems of these devices may be implemented using software applications, hardware circuits, or some combination of both software applications and hardware circuits. All of these implementations are considered to be within the scope of this disclosure.

Also, the software applications described in this disclosure are described as if being distinct software applications. This is done for the purpose of clarity but it may or may not necessarily be the case. The software applications may also be partially or fully integrated with one another and/or may be partially or fully integrated as part of one or more other generalized software applications. These and other alternatives for providing the functionality of the software applications would be apparent to one of ordinary skill in the art in light of this disclosure and are considered within the scope of this disclosure.

Figure 2:
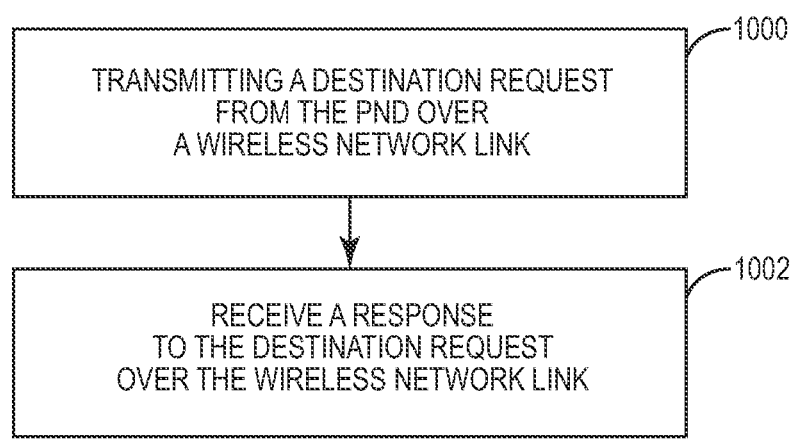
FIG. 2 illustrate exemplary procedures for implementing one embodiment of a method in which the PND receives location data for destinations from the MCD and/or the server computer in FIG. 1.

FIG. 2 illustrates one embodiment of exemplary procedures of operating the PND 20 associated with the user 24. To begin, the PND 20 transmits a destination request to a destination source device from the personal navigation device over a wireless network link (procedure 1000). The destination source device may be the server computer 12 or the MCD 18. When the destination source device is the MCD 18, the wireless network link may be a wireless local area networking link between the PND 20 and the MCD 18. Thus, the PND 20 and the MCD 18 form the ad-hoc network 22. When the destination source device is the server computer 12, the wireless network link may be between the PND 20 and a mobile communications network. For example, the PND 20 may utilize a mobile communications network service so that the wireless link is between a cell phone tower on the mobile communication network and the PND 20. The server computer 12 may be on the mobile communications network or the server computer 12 may be on a packet-based network, such as the Internet, or a switch-based network. In some embodiments, if the PND 20 is unable to connect to the server computer 12 directly, it may connect to the server computer 12 via the MCD 18, where the MCD 18 is configured to relay requests and responses between the PND 20 to the server computer 12.

Next, the PND 20 receives a response to the destination request over the wireless network link (procedure 1002). The response comprises location data for each of one or more destinations. The location data for the destination may be any type of data utilized to locate the destination. For example, the location data may be address data, a building name, a location name, a street name, a street intersection, and or the like. The location data may also be determined based on user information about a friend of the user 24, which may be obtained from a contact list on the MCD 18 or a social network service (not shown), where the user information comprises location information about the friend, such as a home address or an office address. The location data may also be location position data. Generally, location position data is expressed as coordinates for a geographic coordinate system. In this case, the location data may be GPS location data, and/or the like. As a result of the response, the navigation application 34 through the GUI application 36 may present a visual selection indicator that represents at least one of the one or more destinations. Upon receiving input that the visual selection indicator has been selected, the PND 20 may initiate a travel session with the PND 20 where the selected destination is the travel destination.

FIG. 2 illustrates an embodiment of the exemplary procedures described above in FIG. 3 and other related exemplary procedures. In this embodiment, the navigation application 34, through the GUI application 36, allows the user 24 to select the destination source for which to retrieve location data for destinations. Thus, in this case, the PND 20 receives input for a selection of the destination source device (procedure 2000). For example, if the PND 20 is mounted or integrated into the dashboard of a vehicle, the user 24 may select a visual selection indicator on a display of the PND 20 that requests the PND 20 to detect MCDs in proximity to the PND 20. As a result, the PND 20 may detect that the MCD 18 is in proximity to the user 24. Alternatively or additionally, the user 24 may select a visual selection indicator on the display of the PND 20 that request that the PND 20 connect to the user account of the user 24 managed by the server computer 12.

Next, the navigation application 34, through the GUI application 36, may also allow the user 24 to select the record type from which to retrieve location data for destinations. Thus, the PND 20 receives input for a selection of the record type. The personal information records may be calendar records associated with the user 24, contact records associated with the user 24, emails associated with the user 24, a web browser history associated with the user 24, and/or the like. The user 24 may select one or more types of these records to retrieve the location data for destinations depending on the user's circumstances. For example, if the user 24 is in a hurry to get to a meeting, the user 24 may select the calendar records as the record type so that the location data for the destinations are retrieved from the calendar records. On the other hand, if the user 24 recently searched for a location through a web browser, the user 24 may select the web browser history, which may include location data from the web browser cache.

The PND 20 may then establish the wireless network link to connect to the destination source device via one or more of the communication interface devices 32 (procedure 2004). Alternatively, the communication interface devices 32 may have already established the wireless network link, such as when the PND 20 is automatically configured to establish the wireless network link whenever a cell phone tower or the MCD 18 is detected. The PND 20 also generates a destination request (procedure 2006). The particular characteristics and format of the destination request may depend on the destination source device(s) and record type(s) selected. In one embodiment, the destination request is generated so that the destination request is requesting a search of the personal information records by the MCD 18. As a result, the destination request may be configured so that the navigation client 28 of the MCD 18 performs the search. On the other hand, the destination request may also be generated so that the destination request is requesting a search of the user account by the server computer 12. Consequently, the destination request may be configured so that the database interface application 42 can formulate a search query for the database 14. Multiple destination requests may also be generated and formatted accordingly when multiple destination source devices have been selected.

As discussed above, the destination request can also be directed to one or more selected record types. Data fields may be included in the destination request that indicate the record types to be searched. For example, the destination request may be generated so that the destination source device searches the calendar records based on one or more times of interest. The times of interest may be included in the destination request or may be provided by user preferences. In one embodiment, the times of interest are a time period that includes a current time. In addition, the destination request may be generated so that the destination source device searches the emails based on location data indicating the location of the PND 20. The PND 20 may thus generate the destination request to include the location of the PND 20. For instance, the destination request may include address data indicating a current address of the PND 20. The address data may be utilized to determine the emails most likely to be relevant. If the user 24 is driving in Chicago, Ill., it can easily be assumed that addresses in the emails from address data from Wisconsin and Missouri are not relevant location data. Similarly, the destination request may be generated so that the destination source device searches the contact records based on the location data indicating the location of the personal navigation device. Finally, the destination request may be generated so that the destination source device searches the web browser history. The web browser history may be searched based on one or more times of interest or based on the location data indicating the location of the personal navigation device. For example, the destinations related to the most recent web pages may be retrieved and/or the destinations related to the web pages having location data for the destinations near the user 24 can also be retrieved.

Once the destination source device and the record type have been selected, the PND 20 may establish the wireless network link (procedure 2004). In this embodiment, the PND 20 establishes a wireless network link with a mobile communications network in order to communicate with the server computer 12. On the other hand, for communications with the MCD 18, the PND 20 establishes a wireless local area network link between the MCD 18 and the PND 20. Communications over the wireless network link are generally performed with communication packets formatted in accordance with the wireless network protocol after the wireless network link has been established.

To receive the location data for one or more destinations, the PND 20 generates a destination request (procedure 2006). The characteristics of the destination request may depend on the selection of the destination source device(s) and the record source type(s). For example, if the destination request is directed to the server computer 12, the destination request may be formatted so that the database interface application 42 can formulate a search query to the database 14. Similarly, the destination request may be formatted in accordance with the particular characteristics and of the navigation client 28 on the MCD 18 so that the navigation client 28 can search the records stored on the MCD 18. In addition, the destination request may include information based on the record types to be searched. For example, the destination request may include record type indicators that indicate the record types that have been selected to be searched. In addition, the destination request may include one or more times of interest or location data indicating a location of the PND 20. In one embodiment, the destination request includes a current time as a time of interest. Thus, calendar records or a web browser history can be searched based on the time of interest to find location data for destinations. User preferences stored in the user account or on the MCD 18 can be utilized to define a time period around the current time. Alternatively, the server computer 12 or the MCD 18 may simply recognize a destination request as being for a particular time of interest. For instance, the user preferences may be set under the user account or on the MCD 18 so that the server computer 12 and the MCD 18 determine a current time upon receiving destination requests for searches of the calendar records or a web browser history. In addition, destination requests may include parameters that are related to a location of interest. Thus, in one exemplary example, the PND 20 obtains location data, such as address data, indicating a location of the PND 20. The records on the MCD 18 and the server computer 12 may then be searched based on the location data.

After the destination request has been generated, the destination request can then be transmitted over the wireless network link (procedure 2008). In this manner, the destination source device can receive the destination request. If the wireless network link is to the server computer 12, the destination request may be transmitted to the mobile communication network and include information for routing the destination request to the server computer 12. The server computer 12 may be on a packet-switched or circuit-switched network and thus the destination request may be processed by gateways and the like in order to reach the server computer 12. In this embodiment, the destination request may be formatted so that the destination request is requesting a search of the user account of the user 24. Furthermore, the search may be of one or more personal information records under the user account. On the other hand, if the destination request is for the MCD 18, the wireless local area network link is between the PND 20 and the MCD 18. In this embodiment, personal information records may be stored on the MCD 18 and the destination request may be requesting a search of the personal information records by the MCD 18. The destination request is thus transmitted over the wireless local area network link so that the destination request is received by the MCD 18. Multiple destination requests may be generated if multiple destination source devices are selected.

Once the destination request reaches the appropriate destination source device, the destination source device processes the destination request in order to generate a response to the destination request. When the destination request is requesting that the destination source device search be of the personal information records, the response may include location data for at least one destination from the personal information records stored on the MCD 18 or from the user account. Thus, the response may include location data of one or more destinations from the calendar records, the emails, the web browser history, and/or the contact records. The response may also include record type indicators to indicate from which type of record the location data that indicates a particular destination was obtained.

The PND 20 may then receive the response having the location data for each of one or more destinations over the wireless network link (procedure 2010). A determination may then be made whether there is location data for a plurality of destinations (procedure 2012). As explained in further detail below, if the location data is for a plurality of destinations, the PND 20 may calculate probability values for the plurality of destinations (procedure 2014). The probability values measure a probability that a particular destination is a travel destination for the travel session. Once the probability values have been calculated or if there is only location data for one destination, the PND 20, through the GUI application, may present visual selection indicators to the user 24 (procedure 2016). Each visual selection indicator may represent the destinations from the response. In one embodiment, the visual selection indicators include text that allows the user 24 to access which address to select. Alternatively, the navigation application 34 may present the visual selection indicators on a map with the visual selection indicators positioned on the map so as to represent the destinations. The PND 20 may receive input that one of the visual selection indicators has been selected (procedure 2018). For example, the PND 20 may include a touch display. The user 24 may touch the display where a particular visual selection indicator is being presented so that input is received indicating the selected destination. The navigation application 34 may then initiate a travel session having the corresponding destination of the selected visual selection indicator as a travel destination for the travel session (procedure 2020).

Figure 4:
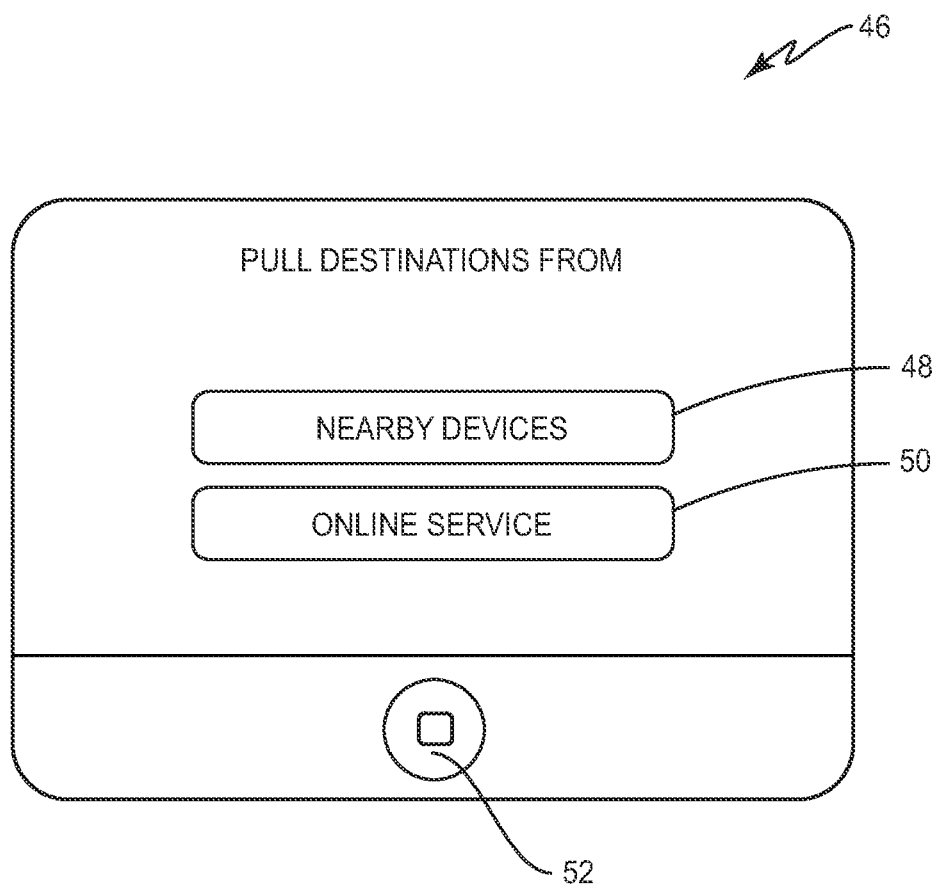
FIG. 4 is one embodiment of a PND GUI that may be utilized to select the MCD and/or the server computer shown in FIG. 1 as the destination source device.

FIG. 4 illustrates one embodiment of a GUI 46 for selecting the destination source device. The GUI 46 may be presented by the navigation application 34 on the PND 20, through the GUI application 36. The GUI 46 includes a visual selection indicator 48 and a visual selection indicator 50. The visual selection indicator 48 is for selecting the PND 20 to detect MCDs in proximity with the PND 20 so as to receive the location data with the destination for the PND 20. In this embodiment, the user 24 may select the visual selection indicator 48 in order to receive the location data from the MCD 18, which is in proximity with the PND 20. The visual selection indicator 50 is for selecting that the location data for the destinations be received from an online service. In this embodiment, the PND 20 has been configured so that selecting the visual selection indicator 50 results in the selection of the location data for the destinations from the user account of the user 24. The GUI 46 also includes a visual selection indicator 52 that is utilized once the user 24 is through selecting from the visual selection indicator 48 and the visual selection indicator 50. In this manner, the selection of the visual selection indicator 52 causes the PND 20 to receive input for the selection of the destination source device. If the user 24 selects the visual selection indicator 48 and then selects the visual selection indicator 52, the PND 20 probes and finds the MCD 18 in proximity with the PND 20. Alternatively or additionally, if the user 24 selects the visual selection indicator 50 and then selects the visual selection indicator 52, the PND 20 may obtain the location data for the destinations from the user account of the user 24 managed by the server computer 12. In one embodiment, the PND 20 may omit presenting the user with an option to select a destination source device, and may automatically choose to request location data from both MCD 18 and a server computer 12.

Figure 5:
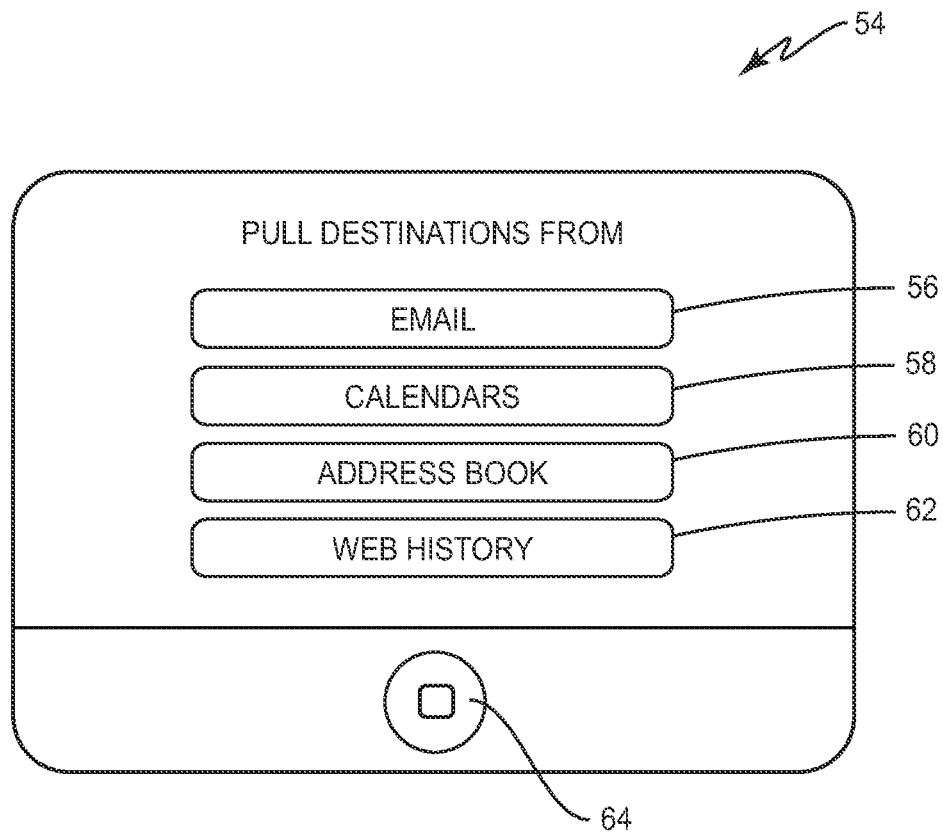
FIG. 5 is one embodiment of a PND GUI that may be utilized to select the record type to be searched by the destination source device.

FIG. 5 illustrates one embodiment of a GUI 54 for selecting the personal information records to be searched once the destination source device(s) have been selected. The GUI 54 may be presented by the navigation application 34 on the PND 20, through the GUI application 36. The GUI 54 includes a visual selection indicator 56, a visual selection indicator 58, a visual selection indicator 60, and a visual selection indicator 62. The visual selection indicators 56, 58, 60, and 62 are for selecting the type of personal information record to be searched by the destination source device(s). In this embodiment, the user 24 may select the visual selection indicator 56 so that the destination source device searches emails having the location data for the destinations. The user 24 may select the visual selection indicator 58 so that the destination source device searches the calendar records having the location data for the destinations. Similarly, the user 24 may select the visual selection indicator 60 so that the destination source device searches the contact records having location data for destinations. Finally, the user 24 may select the visual selection indicator 62 so that the destination source device searches the calendar records having location data for destinations. The GUI 54 also includes a visual selection indicator 64 that is utilized once the user 24 is through selecting from the visual selection indicators 56, 58, 60, and 62. In this manner, the selection of the visual selection indicator 64 causes the PND 20 to receive input for the selection of the record types to be searched by the destination source device.

Figure 6:
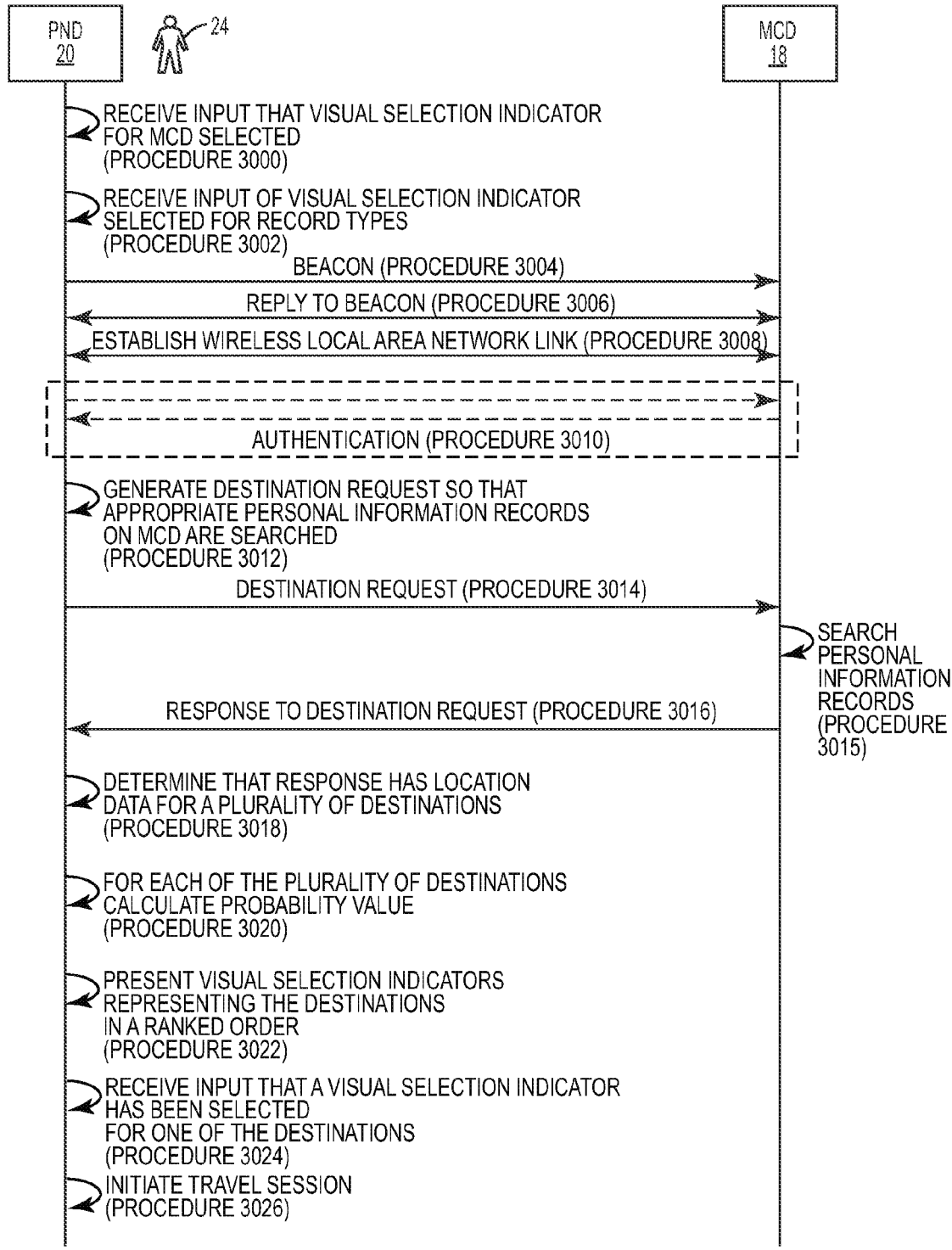
FIG. 6 is a communication flow diagram for implementing one embodiment of the exemplary procedures shown in FIG. 3 where the destination source device is the MCD shown in FIG. 1.

FIG. 6 illustrates a communication flow diagram when the visual selection indicator 48 in FIG. 4 is selected so that the destination source device is the MCD 18. An embodiment of the exemplary procedures is described above in FIG. 3 are shown in FIG. 6 along with other related exemplary procedures. In this case, the PND 20 receives input that the visual selection indicator 48 for MCDs, such as MCD 18, has been selected (procedure 3000). For example, the visual selection indicator 48 may have been selected by the user 24, along with the visual selection indicator 52 in FIG. 4, so that the PND 20 receives the input that the visual selection indicator 48 has been selected. Next, the navigation application 34, through the GUI application 36, receives input of a visual selection indicator(s) for record types (procedure 3002). The user 24 may have selected any one or more of the visual selection indicators 56, 58, 60, and 62 and selected the visual selection indicator 64 to receive the input of the visual selection indicators 56, 58, 60, and 62 selected by the user 24. In this manner, the PND 20 can notify the MCDs, such as MCD 18, to search the emails associated with the user 24, the calendar records associated with the user 24, the contact records associated with the user 24, and/or the web browser history associated with the user 24 that are stored on the MCD 18

The PND 20 may then detect the MCDs that are in proximity with the PND 20. The MCD 18, in this example, is in proximity with the PND 20. In this embodiment, the PND 20 broadcasts a beacon using the wireless local area networking service (procedure 3004). The beacon requests that MCDs in proximity with the PND 20 identify themselves and may include wireless local area networking information for forming a wireless local area networking link with the PND 20. Upon receiving the beacon, the MCD 18 generates a reply to the beacon. The reply may include the MCD identification of the MCD 18, as well as other wireless local area networking information. The MCD 18 sends and the PND 20 receives the reply to the beacon from the MCD 18 (procedure 3006). In this manner, the PND 20 detects that the MCD 18 is within the proximity. The beacon may include the PND identification of the PND 20. In alternative embodiments, a plurality of other MCDs may be in proximity with the PND 20 and thus also reply to the beacon. Thus, the GUI application 36 may present various visual selection indicators to the user 24 to select among the various MCDs. In still other embodiments, the MCD 18 broadcasts the beacon and the PND 20 detects that the MCD 18 is in proximity with the PND 20 by receiving the beacon from the MCD 18. Furthermore, in still other embodiments, the PND 20 detects that the MCD 18 is within the proximity prior to procedures 3000 and 3002.

Note that methods by which PND 20 and MCD 18 in proximity can detect each other, such as by broadcasting and responding to beacons, may either leverage the detection mechanisms that are part of various physical and MAC layer protocols (such as the Inquiry, Inquiry Scan, Paging and/or Service Discovery processes in Bluetooth), or may be implemented separately at the application layer (such as using services like Bonjour over WiFi local area networks).

Next, the PND 20 and the MCD 18 may establish a wireless local area network link between the PND 20 and the MCD 18 via one or more of the communication interface devices 36 (procedure 3008). This may involve configuring a communication layer in accordance with the wireless local area networking protocol being utilized by the PND 20 and the MCD 18. Alternatively, the PND 20 may have already established the wireless local area network link. For example, the PND 20 may be automatically configured to establish the wireless network link whenever it determines that a beacon or a reply to the MCD identification is of the MCD 18. The wireless local area network link may have been established prior to the procedures 3000 and 3002 in FIG. 6.

Once the wireless local area network link is established, an authentication process may take place to authenticate the PND 20 on the MCD 18 (procedure 3010). The PND 20 may present, through the GUI application 36, a GUI (not shown) for the user 24 to enter in a username and password. The username and password are transmitted to the MCD 18 over the wireless local area networking link. Upon providing the appropriate username and password, the PND 20 may have access or at least limited access to the personal information records on the MCD 18 in order to receive location data for destinations. Alternatively, the PND 20 may have a stored username and password that is transmitted to the MCD 18 whenever the MCD 18 is detected. In yet another alternative embodiment, the PND 20 may be automatically authenticated if a PND identification is recognized by the MCD 18 as a trusted source. Furthermore, the PND 20 may have been previously authenticated prior to the procedures 3000 and 3002 in FIG. 6.

The PND 20 then generates a destination request so that the appropriate public information records on the MCD 18 are searched (procedure 3012). The particular characteristics and format of the destination request may depend on the particular embodiment of the MCD 18 being utilized and the record type(s) selected in procedure 3002. In one embodiment, the destination request is generated so that the destination request is requesting a search of the personal information records by the MCD 18. In this embodiment, the destination request is configured so that the navigation client 28 of the MCD 18 performs the search on the appropriate personal information records. The PND 20 then transmits the destination request to the MCD 18 (procedure 3014). As a result, the navigation client 28 on the MCD 18 performs the search of the personal information records (procedure 3015). In this manner, the response to the destination request may be generated by the MCD 18.

The response to the destination request is then received by the PND 20 from the MCD 18 over the wireless local area network link (procedure 3016). In this embodiment, the response has location data for each of a plurality of destinations. Consequently, the PND 20 determinates that the location data is for the plurality of destinations (procedure 3018). As explained in further detail below, for each of the plurality of destinations, the PND 20 calculates a probability value for the destination (procedure 3020). The PND 20, through the GUI application 36, may present visual selection indicators for selection of a destination from the plurality of destinations in a ranked order (procedure 3022). Each of the visual selection indicators represents a corresponding destination of the plurality of destinations. A visual selection indicator may be presented for all of the plurality of destinations or for the destinations having the highest probability values. Each of the plurality of visual selection indicators may be presented in the ranked order in accordance with the probability value of the corresponding destination. The PND 20 may receive input that one of the visual selection indicators has been selected for one of the destinations (procedure 3024). The navigation application 34 may then initiate a travel session having the corresponding destination of the selected visual selection indicator as a travel destination for a travel session (procedure 3026).

Figure 7A:
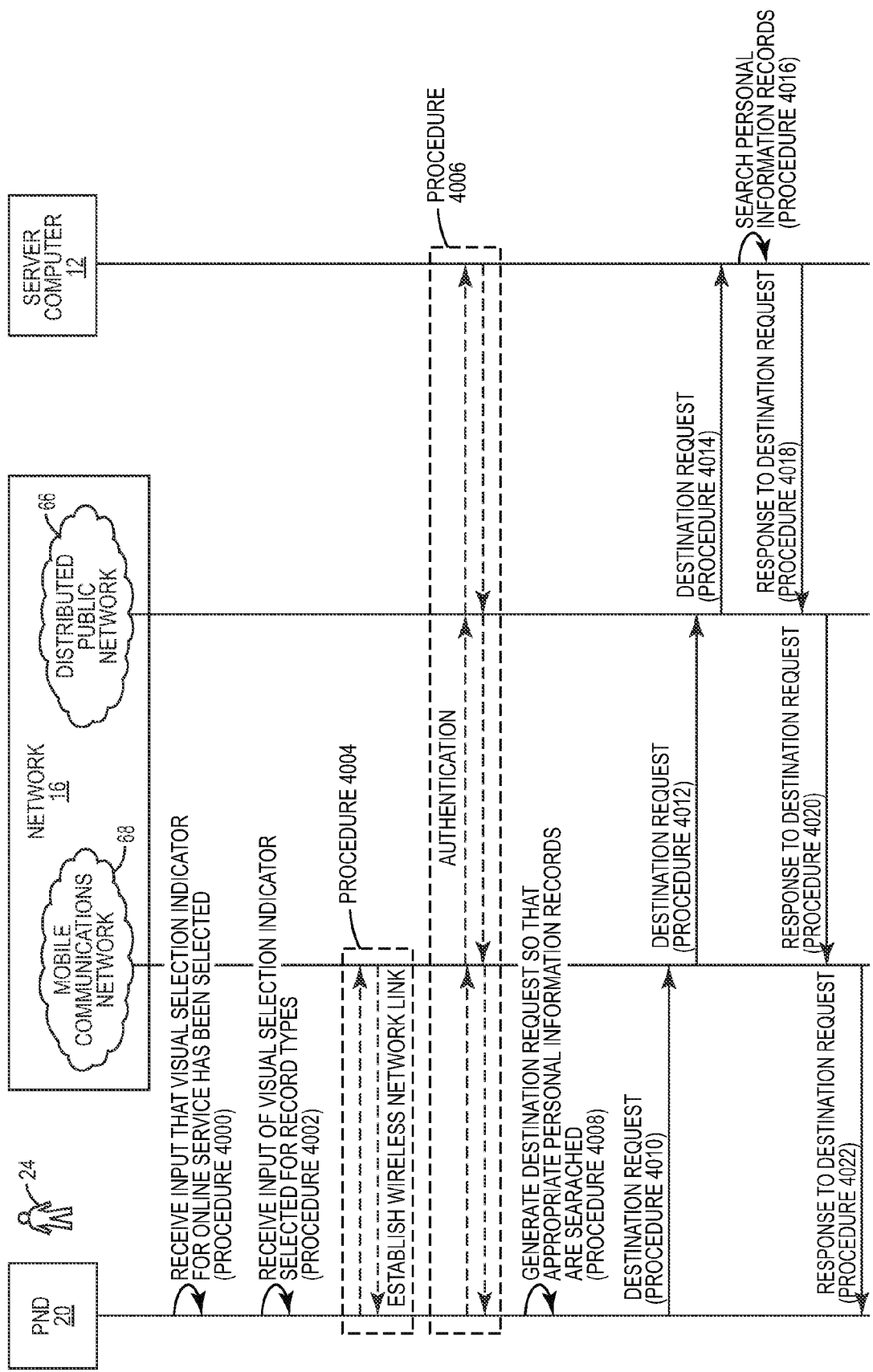

FIGS. 7A and 7B illustrate a communication flow diagram when the visual selection indicator 50 in FIG. 4 is selected so that the destination source device is the server computer 12. An embodiment of the exemplary procedures described above in FIG. 3 is implemented by the PND 20 along with other related exemplary procedures. In this case, the network 16 has a distributed public network 66, such as the Internet, and a mobile communications network 68. The server computer 12 is on the distributed public network 66 while the PND 20 forms a wireless network link with the mobile communications network 68. Alternatively, the server computer 12 may be a server computer 12 on the mobile communications network 68. In yet another embodiment, the PND 20 forms a wireless network link to the distributed public network 66 through Wi-Fi or a satellite link.

The PND 20 receives input that the visual selection indicator 50 for an online service has been selected (procedure 4000). For example, the visual selection indicator 50 may have been selected by the user 24, along with the visual selection indicator 52 in FIG. 4, so that the PND 20 receives the input that the visual selection indicator 50 has been selected. In this embodiment, the PND 20 has been set up so that when the online services are selected, the user account managed by the server computer 12 is searched. Next, the navigation application 34, through the GUI application 36, receives input of the visual selection indicators for record types (procedure 4002). The user 24 may have selected any one or more of the visual selection indicators 56, 58, 60, and 62 and selected the visual selection indicator 64 to receive the input of the visual selection indicators 56, 58, 60, and 62 selected by the user 24. In this manner, the database interface application 42 can notify the server computer 12 regarding the appropriate personal information records to be searched. For example, the input may indicate that the user account of the user 24 should search the emails associated with the user 24, the calendar records associated with the user 24, the contact records associated with the user 24, and/or the web browser history associated with the user 24 that are stored on the database 14.

Next, the PND 20 may establish the wireless network link via one or more of the communication interface devices 36 (procedure 4004). In this embodiment, the PND 20 establishes the wireless network link with the mobile communications network 68. This may involve handshaking between the PND 20 and a cellular tower on the mobile communications network 68 so that the wireless network link is between the PND 20 and the mobile communications network 68. In alternative embodiments, the PND 20 may have already established the wireless network link with the cellular tower on the mobile communications network 68 so that the wireless network link is established prior to the procedures 4000 and 4002 in FIG. 7A. Once the wireless network link is established, an authentication process may take place to authenticate the PND 20 by the server computer 12 (procedure 4006). The PND 20 may present, through the GUI application 36, a GUI (not shown) for the user 24 to enter in a username and password. The username and password are transmitted to the server computer 12 over the wireless network link to the mobile communications network 68. The mobile communications network 68, through gateways and/or the like, may transmit the username and password to the distributed public network 66. The user name and password may then be received by the server computer 12. Upon providing the appropriate username and password, the PND 20 may have access or at least limited access to the personal information records on the database 14 under the user account of the user 24. Alternatively, the PND 20 may have a stored username and password that is transmitted to the server computer 12 whenever the online services are selected. In yet another alternative embodiment, the PND 20 may send the PND identification of the PND 20 to the server computer 12 and the server computer 12 may be configured to automatically authenticate the PND 20 when receiving the PND identification. Furthermore, the PND 20 may have been previously authenticated prior to the procedures 4000 and 4002 in FIG. 7A.

The PND 20 then generates a destination request so that the appropriate public information records under the user account of the user 24 (procedure 4008). The particular characteristics and format of the destination request may depend on the particular embodiment of the server computer 12 and database 14 being utilized and the record type(s) selected in procedure 4002. In this embodiment, the destination request is configured so that the database interface application 42 of the server computer 12 performs the search of the appropriate personal information records under the user account. The PND 20 then sends the destination request to the server computer 12. In this particular embodiment, the PND 20 transmits the destination request to the mobile communications network 68 over the wireless network link (procedure 4010). The mobile communications network 68, through gateways and/or the like, routes the destination request to the distributed public network 66 (procedure 4012). The distributed public network 66 then routes the destination request to the server computer 12 (procedure 4014). As a result, the database interface application 42 performs the search of the personal information records under the user account of user 24 (procedure 4016). In this manner, the response to the destination request may be generated by the server computer 12.

The response to the destination request is then received by the PND 20 from the server computer 12. In this particular embodiment, the response to the destination request is first transmitted by the server computer 12 to the distributed public network 66 (procedure 4018). Next, the response to the destination request is routed to the mobile communications network 68 (procedure 4020), through gateways and/or the like. The response is received by the PND 20 over the wireless network link from the mobile communications network 68 (procedure 4022). In this embodiment, the response also has location data for each of a plurality of destinations. Consequently, the PND 20 determines that the location data is for the plurality of destinations (procedure 4024). As explained in further detail below, for each of the plurality of destinations, the PND 20 calculates a probability value for the destination (procedure 4026). The PND 20, through the GUI application 36, may then present visual selection indicators for selection of a destination from the plurality of destinations in a ranked order (procedure 4028). Each of the visual selection indicators represents a corresponding destination of the plurality of destinations. A visual selection indicator may be presented for all of the plurality of destinations or for the destinations having the highest probability values. Each of the plurality of visual selection indicators may be presented in the ranked order in accordance with the probability value of the corresponding destination. The PND 20 may receive input that one of the visual selection indicators has been selected for one of the destinations (procedure 4030). The navigation application 34 may then initiate a travel session having the corresponding destination of the selected visual selection indicator as a travel destination for a travel session (procedure 4032).

Figure 8:
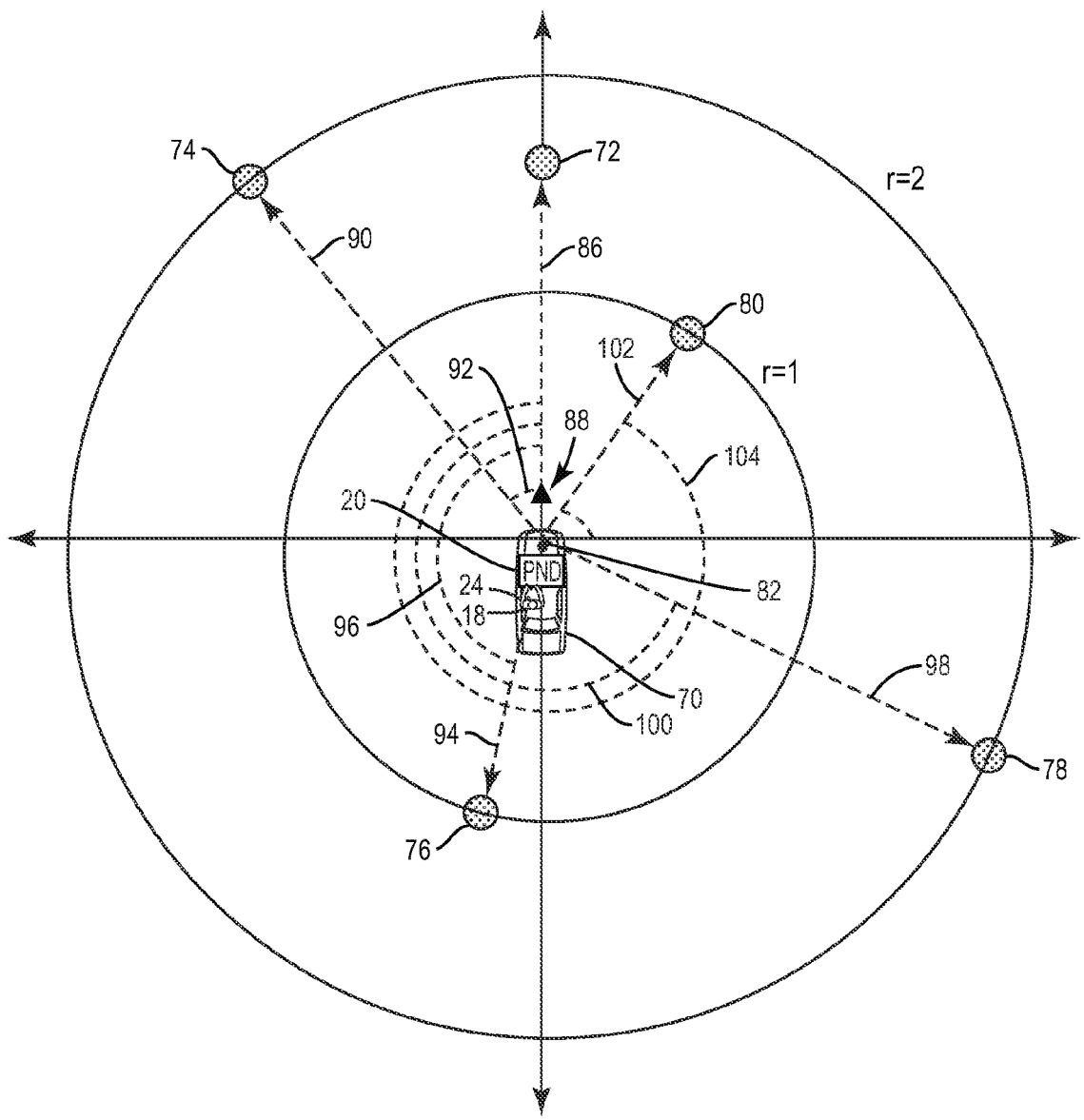
FIG. 8 illustrates one embodiment of a vehicle having the PND mounted on the vehicle and a plurality of destinations around the vehicle that may be selected as travel destinations for a travel session using the PND.

FIG. 8 illustrates one embodiment of a vehicle 70 being driven by the user 24 and having an embodiment of the PND 20 mounted on the vehicle 70. The MCD 18 is assumed as being carried by the user 24. Furthermore, FIG. 8 illustrates a plurality of destinations 72, 74, 76, 78, and 80 that may be indicated by the location data in the response to the destination request. For each of the plurality of destinations 72, 74, 76, 78, and 80, the PND 20 may calculate a probability value that the destination 72, 74, 76, 78, and 80 is a travel destination. As mentioned above, the probability value measures a probability that the destination 72, 74, 76, 78, and 80 is the travel destination. The location data from the response may be in the form of address data or some other more descriptive form of indicating the destination location. Since the location data for each of the plurality of destinations 72, 74, 76, 78, and 80 may be not be in a quantitative form when received in the response, the location data can be converted into a quantitative form by the navigation application 34 utilizing the map records. For example, the navigation application 34 may convert address data into location position data, such as GPS location data or LBS location data. Quantitative location data may also be converted into more descriptive forms of location data by the navigation application 34 using the map records.

Travel data obtained by the PND 20 may be utilized to determine the probability value. The travel data may include location data that indicates a location 82 of the PND 20 and direction data that indicates a direction of travel 84 of the PND 20. The PND 20 may thus have some form of gyroscopic device or compass that allows the PND 20 to determine the direction of travel 84 and generate the direction data. The direction data allows for the calculation of an angular difference between the direction of travel 84 of the PND 20 and a displacement direction from the vehicle to the destination 72, 74, 76, 78, and 80. The first destination 72 has a displacement distance of 1.5 radial distance units from the vehicle 70. However, the first destination 72 is aligned with the direction of travel 84. The first destination 72 has a displacement direction 86. As such, an angular difference 88 between the direction of travel 84 of the PND 20 and the displacement direction 86 is zero (0) radians. The second destination 74 has a displacement distance of 2 radial distance units from the PND 20. The second destination 74 has a displacement direction 90. There is an angular difference 92 between the direction of travel 84 and the displacement direction 90 of 0.79 radians. Next, the third destination 76 has a displacement distance of 1 radial distance units from the PND 20. The third destination 76 has a displacement direction 94. There is an angular difference 96 between the direction of travel 84 and the angular difference 96 of 2.62 radians. The fourth destination 78 has a displacement distance of 2 radial distance units from the PND 20. The fourth destination 78 has a displacement direction 98. There is an angular difference 100 between the direction of travel 84 and the displacement direction 98 of 4.19 radians. Finally, the fifth destination 80 has a displacement distance of 1 radial distance units from the PND 20. The fifth destination 80 has a displacement direction 102. There is an angular difference 104 of 5.76 radians between the direction of travel 84 and the displacement direction 102 of the fifth destination 80.

The PND 20 may calculate the displacement distance and the angular difference 88, 92, 96, 100, 104 between each of the destinations 72, 74, 76, 78, and 80 and the PND 20 based on the travel data and the location data indicating each of the destinations 72, 74, 76, 78, and 80 from the response. The probability value for each of the destinations 72, 74, 76, 78, and 80 may be a function of the displacement distance and the angular differences 88, 92, 96, 100, and 104, the location 82, and the direction of travel 84. In addition, the travel data may include speed data indicating a speed of the PND 20. The probability value for each of the destinations 72, 74, 76, 78, and 80 may further be a function the speed. Furthermore, the response may include a record type indicator for each of the destinations 72, 74, 76, 78, and 80 a record type of a record from which the location data that indicates the destination was obtained. For example, the response may include record type indicators indicating that the location data for the first destination 72 is from an email, the location data for the second destination 74 is from a calendar record, the location data for third destination 76 is from a contact record, the location data for fourth destination 78 is from a web browser history, and the location data for fifth destination 80 is from a calendar record. The probability value for each of the destinations 72, 74, 76, 78, and 80 may be a further function of a weight assigned to the record type of the record from which the location data that indicates each of the destinations 72, 74, 76, 78, and 80 was obtained.

One embodiment of an equation that may be utilized by the PND 20 to calculate the probability value of each of the destinations 72, 74, 76, 78, and 80 below.

$$P = \frac{1}{1+r}\left[\left(\frac{1}{2}\cos(\phi_h - \phi_d) + 1\right)*(DF+S) + LF\right]*T$$

Figure 3:
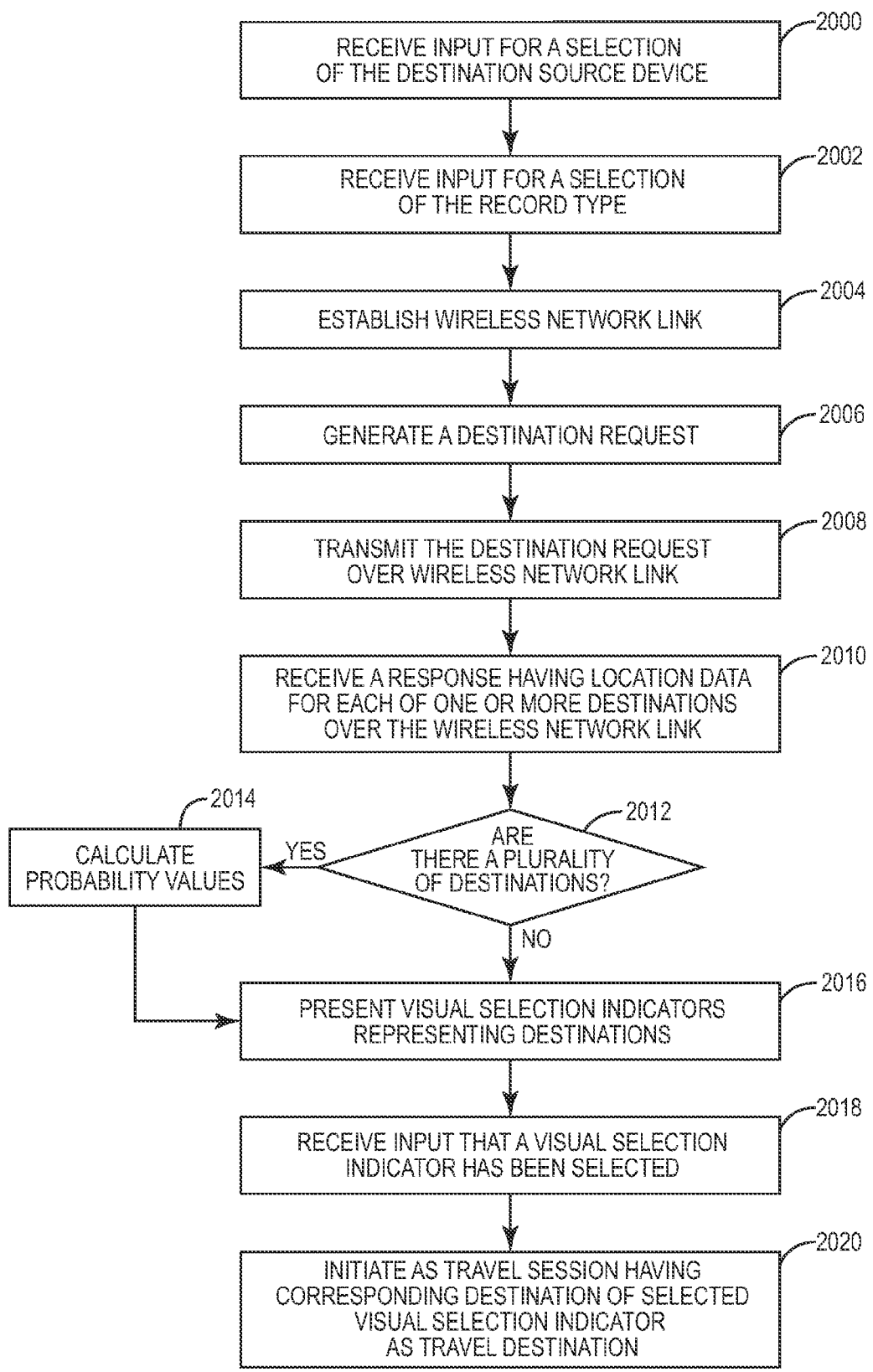
FIG. 3 illustrate exemplary procedures for implementing one embodiment of a method shown in FIG. 2 in which a user may select the MCD or the server computer shown in FIG. 1 as a destination source device and may also select a record type to be searched by the destination source device.

P=probability value for the destination 72, 74, 76, 78, 80
r=radial distance from the PND 20 (as the displacement distance)
$\phi_h$=angle of the displacement direction (86, 90, 94, 98, 102)
$\phi_d$=angle of the direction of travel 84
$\phi_h-\phi_d$=angular difference (88, 92, 96, 100, 104) between the between the direction of travel 84 and the displacement direction (86, 90, 94, 98, 102)
DF=Directional Floor Adaptive Variable
S=speed of the PND 20
LF=Location Floor Adaptive Variable
T=weight assigned to the record type of the record from which the location data that indicates each of the destinations 72, 74, 76, 78, 80 was obtained The equation above illustrates one embodiment of the procedures 2014, 3020, and 4026 in FIGS. 3, 6, and 7 respectively for calculating the probability value of each of the destinations 72, 74, 76, 78, and 80. The parameter $\phi_d$ may be utilized if there is a reference direction (such as for example, due north) that is separate from the direction of travel 84. Thus, $\phi_d$ is the angle between the direction of travel 84 and the reference direction. In this example, however, the direction of travel 84 is utilized as the reference direction and thus $\phi_d$ may be set to zero (0). Also, in this case, the parameter $\phi_h$ is equal to the angular difference (88, 92, 96, 100, and 104). However, in other embodiments, the reference direction may be static and the parameters $\phi_h$ may have some angular displacement with the reference direction. Nevertheless, calculation of $\phi_h-\phi_d$ as the angular difference (88, 92, 96, 100, and 104) may be utilized to cancel the angular displacement from the reference direction when the parameters $\phi_d$ and $\phi_h$ are measured relative to a reference direction separate from the direction of travel 84.

The parameter T is the weight assigned to the record type of the records from which the location data was obtained for each the destinations 72, 74, 76, 78, and 80. In this particular example of the calculation, the weight T is assumed to be set in accordance with the table provided below.

| Record Type | Weight |
| --- | --- |
| Email (E) | 1 |
| Contact Record (CoR) | 1 |
| Calendar Record (CaR) | 1 |
| Web Browser History (WBH) | 1 |

In this particular example of the calculation of the equation above for each of the destinations 72, 74, 76, 78, and 80, the weight for each record type is assumed to be the same. For example, these may be default values assigned to each of record types. The user 24 may adjust the weight T for each record type through the configuration of user preferences.

Furthermore, the PND 20 may adjust the weight T for each record type based on a selection history of the user 24.

The parameter DF is a direction floor adaptive variable which is present so as to give the direction of travel 84 a weight even when the speed, S, of the PND 20 is zero (0). The parameter LF is a location adaptive variable and is present in the equation so that the location of the PND 20 is given weight. The value for the speed, S, of the PND 20, the direction floor constant, DF, and the location floor constant, LF, are given below.

| Variable | Value |
| --- | --- |
| S | 1.0 |
| DF | 0.5 |
| LF | 0.1 |

Next, the table below illustrates exemplary calculations for the probability value, P of each of the destinations 72, 74, 76, 78, and 80, based on the equation above.

| Destination | P | r (normalized units) | $\frac{1}{1+r}$ | $\phi_h - \phi_d$ (Radians) | $\frac{1}{2}\cos(\phi_h - \phi_d) + 1$ | DF + S | T |
| --- | --- | --- | --- | --- | --- | --- | --- |
| First Destination 72 | .64 | 1.5 | .4 | 0 | 1 | 1.5 | 1 (E) |
| Second Destination 74 | .46 | 2.0 | .33 | .79 | .85 | 1.5 | 1 (CaR) |
| Third Destination 76 | .10 | 1.0 | .5 | 2.62 | .07 | 1.5 | 1 (CoR) |
| Fourth Destination 78 | .16 | 2.0 | .33 | 4.19 | .25 | 1.5 | 1 (WBH) |
| Fifth Destination 80 | .75 | 1.0 | .50 | 5.76 | .93 | 1.5 | 1 (CaR) |

Consequently, the table above is exemplary of the procedures 2014, 3020, and 4026 in FIGS. 3, 6, and 7, respectively, for calculating the probability values of each of the destinations 72, 74, 76, 78, and 80. In one embodiment of the present disclosure, the speed S and angular differences 88, 92, 96, 100, 104 are computed over a time interval so as to capture a more accurate measurement of each by filtering out short lasting fluctuations. The trade off with this approach is that the system may become slower to adapt to change. In another embodiment of the present disclosure the radial distance, r from a possible destination is not taken to be the "as the crow flies" distance, but the shortest route to the destination if traveled by the current mode of travel (by car, bike, foot, etc.). This information can be readily determined with current PNDs. In another embodiment of the present disclosure, the probabilities, P, are further weighted by user profile matching to the user 24 (of the PND 20 and/or MCD 18). For example, destinations of interest to the user 24, destinations receiving favorable reviews from other users like the user 24, and/or destinations where friends of the user 24 are currently located may all receive adjusted probability scores based on the information in the user account of the user 24. It should be noted that many variations on computing destination probabilities are possible, as would be apparent to one of ordinary skill in the art in light of this disclosure, and should be considered within the scope of the present disclosure.

Figure 9:
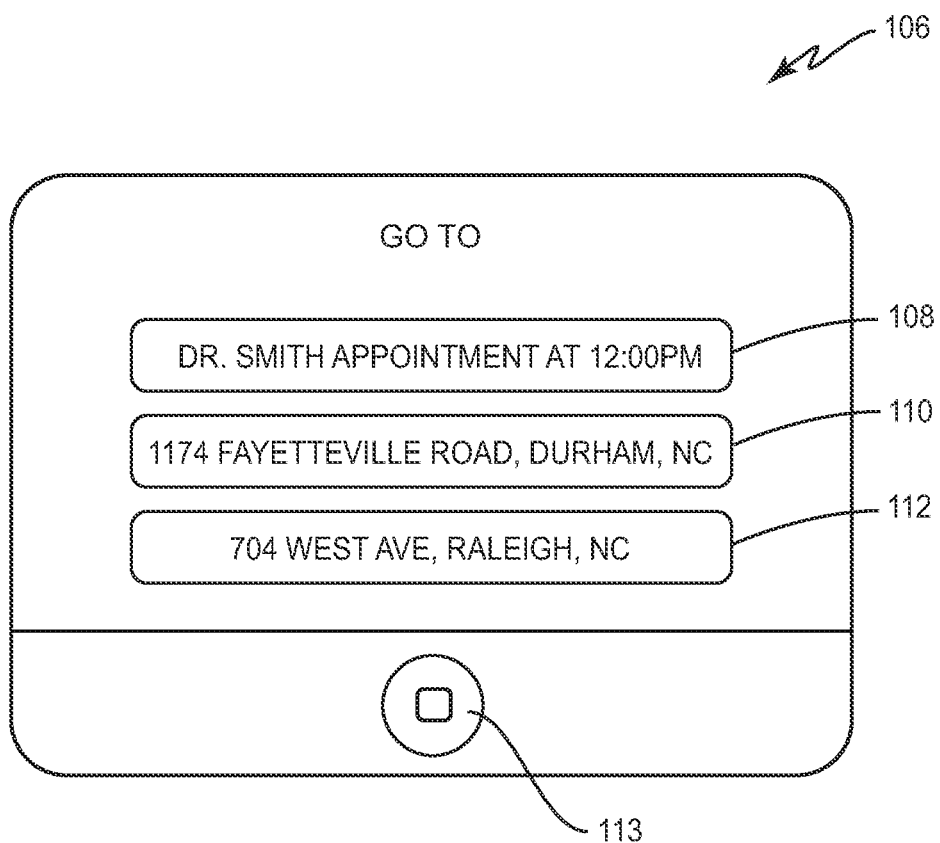
FIG. 9 illustrates one embodiment of a PND GUI for selecting one of the destinations as a travel destination for a travel session initiated by the PND.

FIG. 9 illustrates one embodiment of a GUI 106 that presents visual selection indicators 108, 110, and 112. The visual selection indicator 108 represents the fifth destination 80, which has the highest of the probability values. The visual selection indicator 110 represents the first destination 72 and has the second highest of the probability values. Finally, the third visual selection indicator 112 has the third highest of the probability values and represents the second destination 74. The PND 20, through the GUI application 36 presents the visual selection indicators 108, 110, and 112 for selection by the user 24. In this example, the GUI 106 shows visual selection indicators 108, 110, and 112 for the three highest ranking destinations 80, 72, and 74 respectively. This may be because the PND 20 has set a threshold value of 0.5 for the probability values in order to illustrate visual selection indicators 108, 110, and 112 for the destinations 80, 72, and 74. Note that the visual selection indicators 108, 110, and 112 are presented in according to a ranked order in accordance with the probability value of the corresponding destination 80, 72, and 74. The user 24 may select one of the visual selection indicators 108, 110, and 112 and then select the visual selection indicator 113 to finalize the selection. As a result, the PND 20 receives an input indicating that one of the plurality of visual selection indicators 108, 110, and 112 has been selected. In response to the input, the PND 20 initiates a travel session having the corresponding destination 80, 72, and 74 of the selected visual selection indicator 108, 110, and 112 as the travel destination for a travel session.

Figure 10:
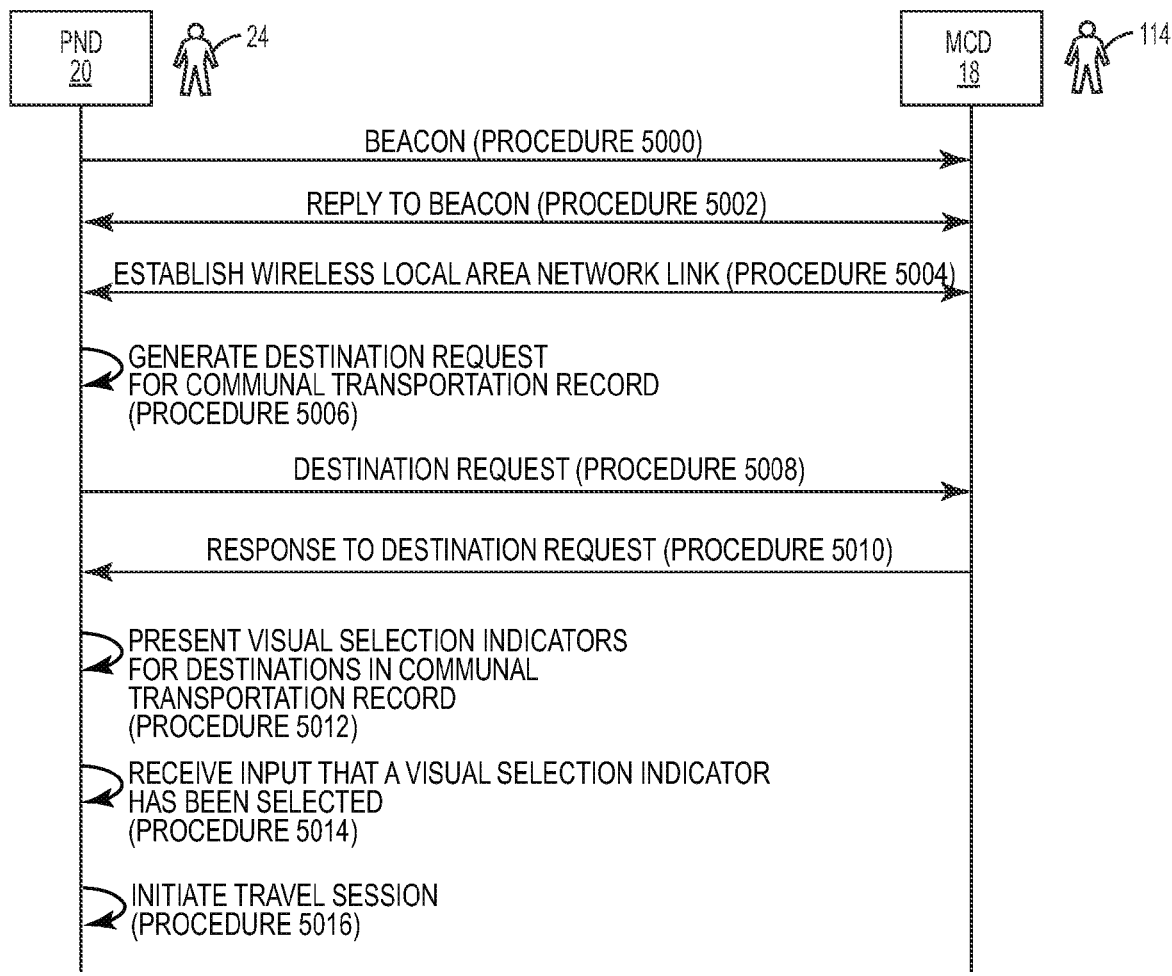
FIG. 10 illustrates a communication flow diagram for implementing one embodiment of the method shown in FIG. 2 where the PND is being used to provide a communal transportation service and requests a communal transportation record from the MCD of a user of the MCD utilizing the communal transportation service.

FIG. 10 is a communication flow diagram illustrating another embodiment of the exemplary procedures described above in FIG. 2, along with other related exemplary procedures. In this embodiment, the user 24 is assumed to be the driver that provides communal transportation. Communal transportation may be any type of transportation in which a driver provides transportation services to members of the community. Generally, communal transportation services are provided for a fee. The user 114 in this example is assumed to be associated with the MCD 18. The MCD 18 in this example is assumed to store a communal transportation indicating at least one destination utilized by the user 114 when soliciting communal transportation. Since the user 24 may not be a known individual to the user 114, the location data within the communal transportation record may be more generalized, since the user 114 may not want untrusted individuals, knowing or having the capability of knowing, precise private destination information. For example, the user 114 may live in a particular neighborhood. However, the communal transportation record may include location data, such as a street intersection, near their home. In this manner, the user 114 can be dropped off near their home by the user 24 without having to disclose precise location information.

In FIG. 10, the MCD 18 is in proximity with the PND 20 once the user 114 gets into the communal transportation vehicle. For example, we assume for the purposes of explanation that the PND 20 is mounted within a taxi cab and the user 24 is a taxi cab driver. In this embodiment, the PND 20 broadcasts a beacon using the wireless local area networking service (procedure 5000). The beacon requests that MCDs in proximity with the PND 20 identify themselves and may include wireless local area networking information for forming a wireless local area networking link with the PND 20. The beacon may also include parameters indicating that the PND 20 is associated with a communal transportation service. Upon receiving the beacon, the MCD 18 generates a reply to the beacon. The reply may include the MCD identification of the MCD 18, as well as other wireless local area networking information. The MCD 18 sends and the PND 20 receives the reply to the beacon from the MCD 18 (procedure 5002). In this manner, the PND 20 detects that the MCD 18 is within the proximity.

Next, the PND 20 and the MCD 18 may establish a wireless local area network link between the PND 20 and the MCD 18 (procedure 5004). This may involve configuring a communication layer in accordance with the wireless local area networking protocol being utilized by the PND 20 and the MCD 18. Once the wireless local area network link is established, the PND 20 generates a destination request for a communal transportation record from the MCD 18 (procedure 5006). The PND 20 then transmits the destination request to the MCD 18 (procedure 5008). In turn, a GUI (not shown) may be presented to the user 114 indicating whether to grant the PND 20 permission to obtain the communal transportation record. If the user 114 grants the requested permission to the PND 20, the MCD 18 generates a response to the destination request. In this example, the response to the destination request includes the communal transportation record on the MCD 18.

The response to the destination request is then received by the PND 20 from the MCD 18 over the wireless local area network link (procedure 5010). The PND 20, through the GUI application 36, may present visual selection indicators for destinations in the communal transportation record (procedure 5012). Furthermore, fares for each of the destinations in the communal transportation record may also be calculated based on location data indicating a current location of the PND 20 and the location data from the communal transportation record. Once the user 24 selects one of the destinations, the PND 20 may receive input that one of the visual selection indicators has been selected for the selected destination (procedure 5014). The navigation application 34 may then initiate a travel session having the corresponding destination of the selected visual selection indicator as a travel destination for a travel session (procedure 5016).

Figure 11:
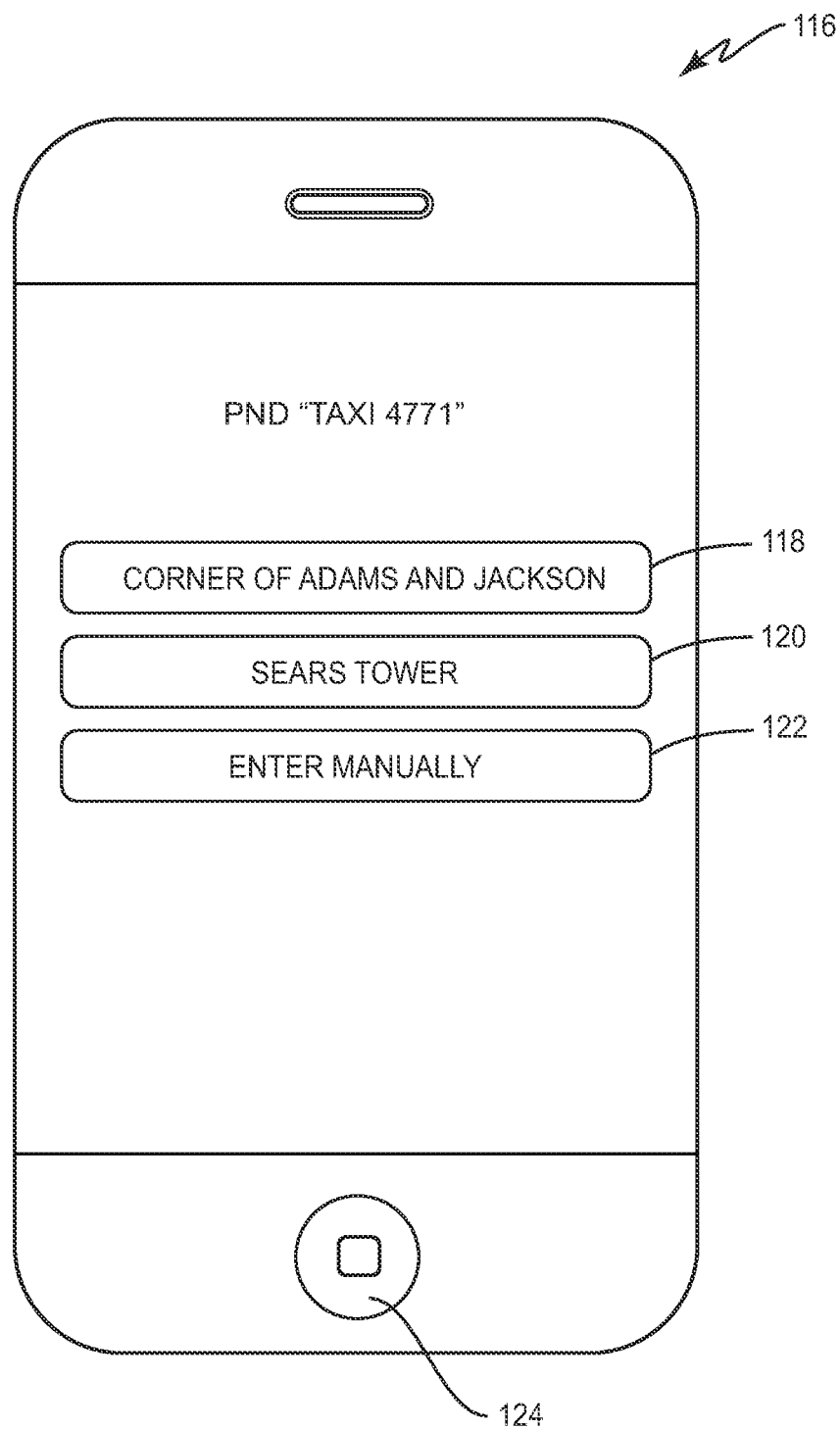
FIG. 11 is a PND GUI or an MCD GUI having visual selection indicators that are presented on the PND of thru user of the PND or the MCD of a user of the MCD for communal transportation services.

FIG. 11 is one embodiment of a GUI 116 presented to the user 24, in this case a taxi cab driver. The GUI 116 has visual selection indicators 118, 120, 122, and 124. Visual selection indicators 118 and 120 are visual selection indicators that represent the destinations from the communal transportation record received in the response to the destination request. After selection of one of the visual selection indicators 122 and 124, the user 24 may select the visual selection indicator 124. In this manner, the PND 20 receives an input that one of the visual selection indicators 118, 120 has been selected in order to initiate a travel session having the destination of the selected visual selection indicator 118, 120 as the travel destination. On the other hand, the user 24 may also select the visual selection indicator 122. The visual selection indicator 122 initiates a process in which the PND 20 is requesting that the MCD 18 provide location data as user input.

Alternatively, the GUI 116 is presented to the user 114 on the MCD 18 as a result of receiving the destination request in procedure 5008. Rather than present the visual selection indicators 118, 120, 122, and 124 to the user 24 (i.e. the taxi cab driver) in procedure 5012, the response to the destination request may simply include location data for the destination of the selected visual selection indicator (either visual selection indicator 118, 120) by the user 114. This location data for the destination may be included in the response to the destination request based on the selected visual selection indicator (either visual selection indicator 118, 120) that is selected by user 114 with the MCD 18 when user 114 selects the visual selection indicator 124. Upon receiving the location data for the destination, the PND 20 may set the travel destination for a travel session using the location data.

Figure 12:
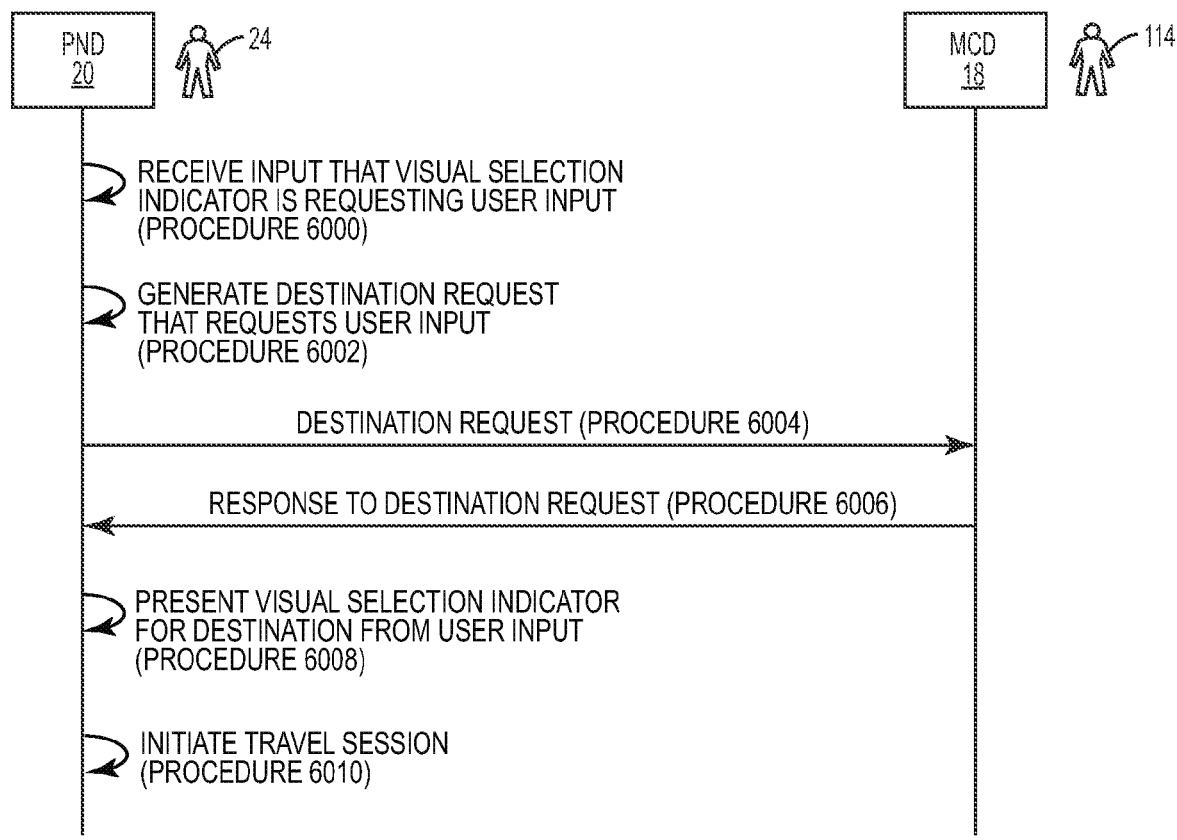
FIG. 12 illustrates a communication flow diagram for implementing one embodiment of the method shown in FIG. 2 where the user of the PND that is being used to provide a communal transportation service and requests that the user of the MCD provide user input for a destination.

FIG. 12 illustrates one embodiment of exemplary procedures in which the PND 20 is requesting that the user 114 of the MCD 18 provide location data for the destination as user input. In this embodiment, it is assumed that procedures 5000 through 5012 from FIG. 10 have already taken place. However, in this embodiment, the PND 20 receives an input that the visual selection indicator 122 for requesting user input has been selected (procedure 6000). As a result, the PND 20 generates a destination request that request user input from the MCD 18 (procedure 6002). The PND 20 then transmits the destination request to the MCD 18 (procedure 6004). In turn, a GUI may be presented to the user 114 that allows the user 114 to enter location data for the destination as user input. Once the user input is received by the MCD 18, the MCD 18 generates a response to the destination request. In this example, the response to the destination request includes the user input from the user 114.

The response to the destination request is then received by the PND 20 from the MCD 18 over the wireless local area network link (procedure 6006). Once the response having the user input is received, the navigation application initiates a travel session having the destination indicated by the user input as a travel destination (procedure 6008).

Alternatively, if the GUI 116 is presented to the user 114 on the MCD 18 as a result of receiving the destination request in procedure 5008. The user 114 may select the visual selection indicator 122 and provide the user input. The user input is provided in the response when the user selects the visual selection indicator 124. The response is then sent to the PND 20. Upon receiving the user input, the PND 20 may set the travel destination for a travel session using the user input.

Figure 13:
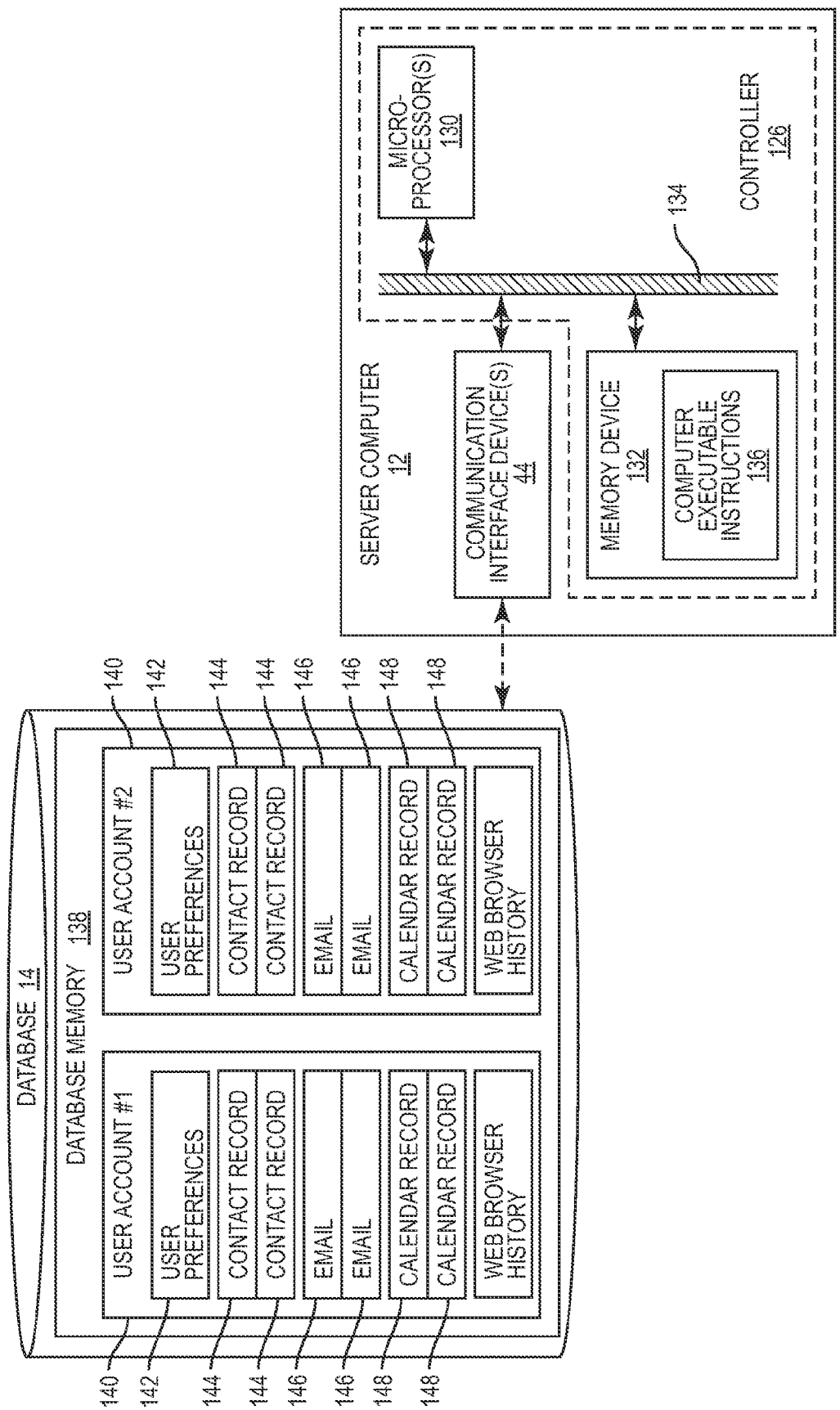
FIG. 13 illustrates one embodiment of the server computer shown in FIG. 1.

FIG. 13 illustrates one embodiment of the server computer 12 shown in FIG. 1. The server computer 12 includes a controller 126 and a communication interface devices 44. The database 14 connects to the server computer 12 through communication interface device 128. The communication interface devices 44 are operable to communicatively couple the server computer 12 to the network 16. As discussed above, network 16 may include various different types of networks. The communication interface devices 44 are adapted to facilitate communications with one or more communication services on the network 16. In this example, the communication interface devices 44 may facilitate communications for any number of communication services provided by mobile communications networks, packet-switched networks, circuit switched networks, and/or the like.

In this embodiment, the controller 126 has general purpose computer hardware, in this case one or more microprocessors 130, and a non-transitory computer readable medium, such as a memory device 132, and a system bus 134. The controller 126 may also include other hardware such as, control logic, other processing devices, additional non-transitory computer readable mediums, and the like. User input and output devices (not shown), such as monitors, keyboards, mouse, touch screens, and the like may also be provided to receive input and output information from a server administrator. The memory device 132 may store computer executable instructions 136 for execution by the microprocessors 130. The computer executable instructions 136 are executable by the microprocessors 130 and configure the operation of the microprocessors 130 so that the microprocessors 130 implement the software applications for the server computer 12 discussed above. A system bus 134 is operably associated with the microprocessors 130 so that microprocessors 130 can exchange information between the controller 126, the memory device 132, and the communication interface devices 44 and other hardware components internal to the server computer 12.

The database 14 includes database memory 138 that stores the user accounts 140. The database 14 may also store additional information, such as database tables in local memory. Furthermore, the database 14 may include additional programmed hardware components (not shown) that allow for the creation, organization, retrieval, updating, and/or storage of database records. In this example, the user account 140 includes user preferences data 142 indicating the user preferences of the user. Also, in this example, the personal information records of the user are stored in the user accounts 140. The user accounts 140 include contact records 144, emails 146, calendar records 148, and web browser history 150.

Figure 14:
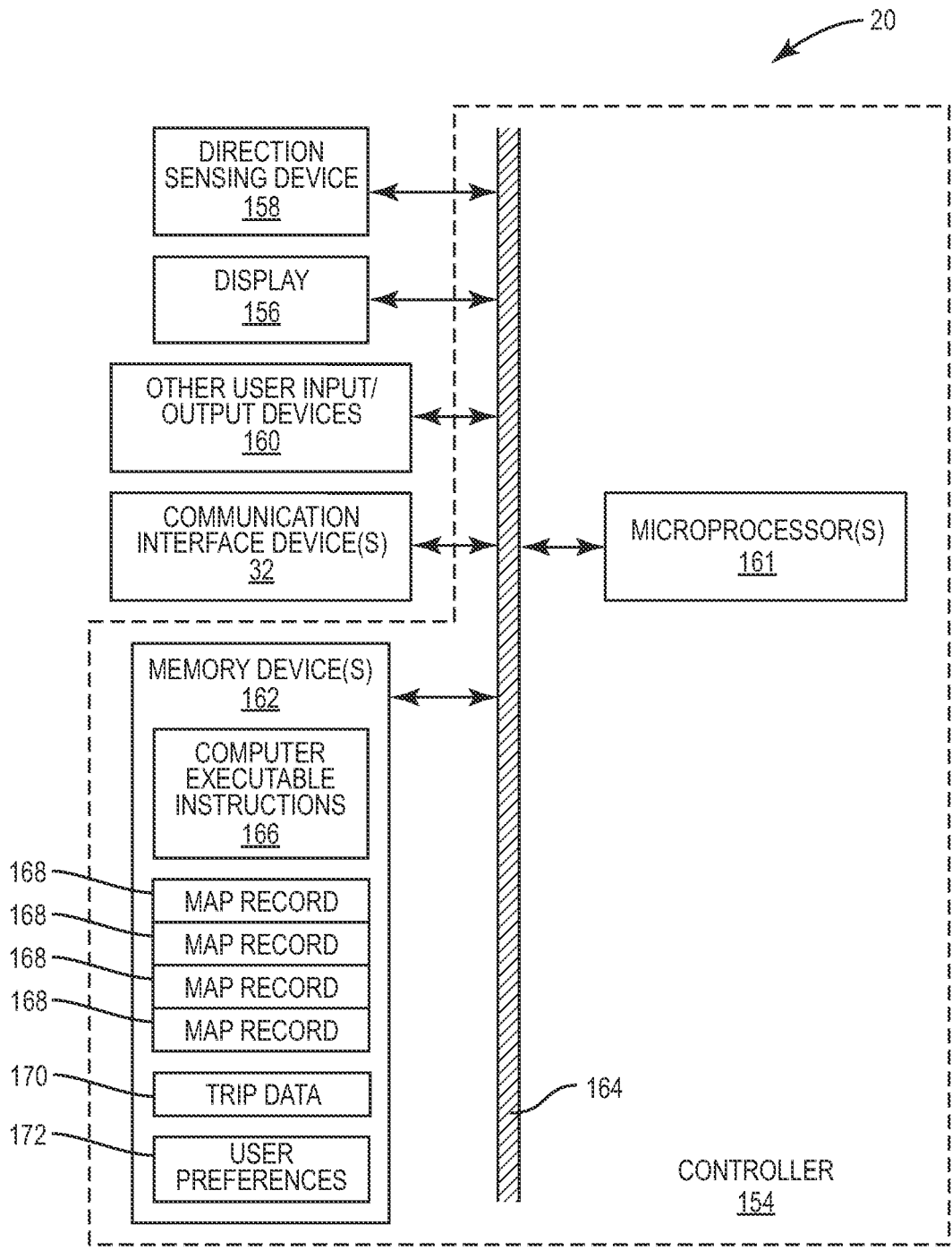
FIG. 14 illustrates one embodiment of the PND shown in FIG. 1.

FIG. 14 illustrates one embodiment of the PND 20. The PND 20 includes a controller 154, communication interface devices 32, a display 156, a direction sensing device 158 (such as a gyroscope or compass), and other user input and output devices 160. Communication interface devices 32 are operable to communicatively couple the PND 20 to the network 16 or to establish a wireless local area network link. As discussed above, the network 16 may include various different types of mobile communications networks, packet-switched networks, circuit switched networks. The wireless local area network link may include various different types of wireless local area type networking links. The communication interface devices 32 are adapted to facilitate communications with one or more communication services on the network 16 provide the wireless local area network links. In this example, the communication interface devices 32 may facilitate communications for any number of communication services provided by mobile communications networks, packet-switched networks, circuit switched networks, ad-hoc networks 22 and/or the like. The communication interface devices 32 may also be utilized to establish a satellite link.

Next, the controller 154 has general purpose computer hardware, in this case one or more microprocessors 161, a non-transitory computer readable medium, such as memory device 162, and a system bus 164. The system bus 164 is operably associated with the microprocessors 161 so that microprocessors 161 can exchange information with the communication interface devices 32, the display 156, and other user input and output devices 160. Furthermore, the controller 154 may also include other hardware such as, control logic, other processing devices, additional non-transitory computer readable mediums, and the like. The memory device 162 may store computer executable instructions 166 for execution by the microprocessors 161. The computer executable instructions 166 configure the operation of the microprocessors 161 so that the microprocessors 161 implement the software applications for the PND 20 discussed above. The memory device 162 may also store other data utilized by the PND 20. For example, the memory device 162, in this example, stores map records 168, trip data 170, and user preferences data 172. The display 156 may be any suitable display for PNDs. For example, the display 156 may be a touch screen, a monitor, an LCD display, a plasma display, and/or the like. The other user input and output devices 160 may be a keyboard, a microphone, a head-set, a mouse, and/or an input button, and may depend on the particular configuration of the PND 20.

Figure 15:
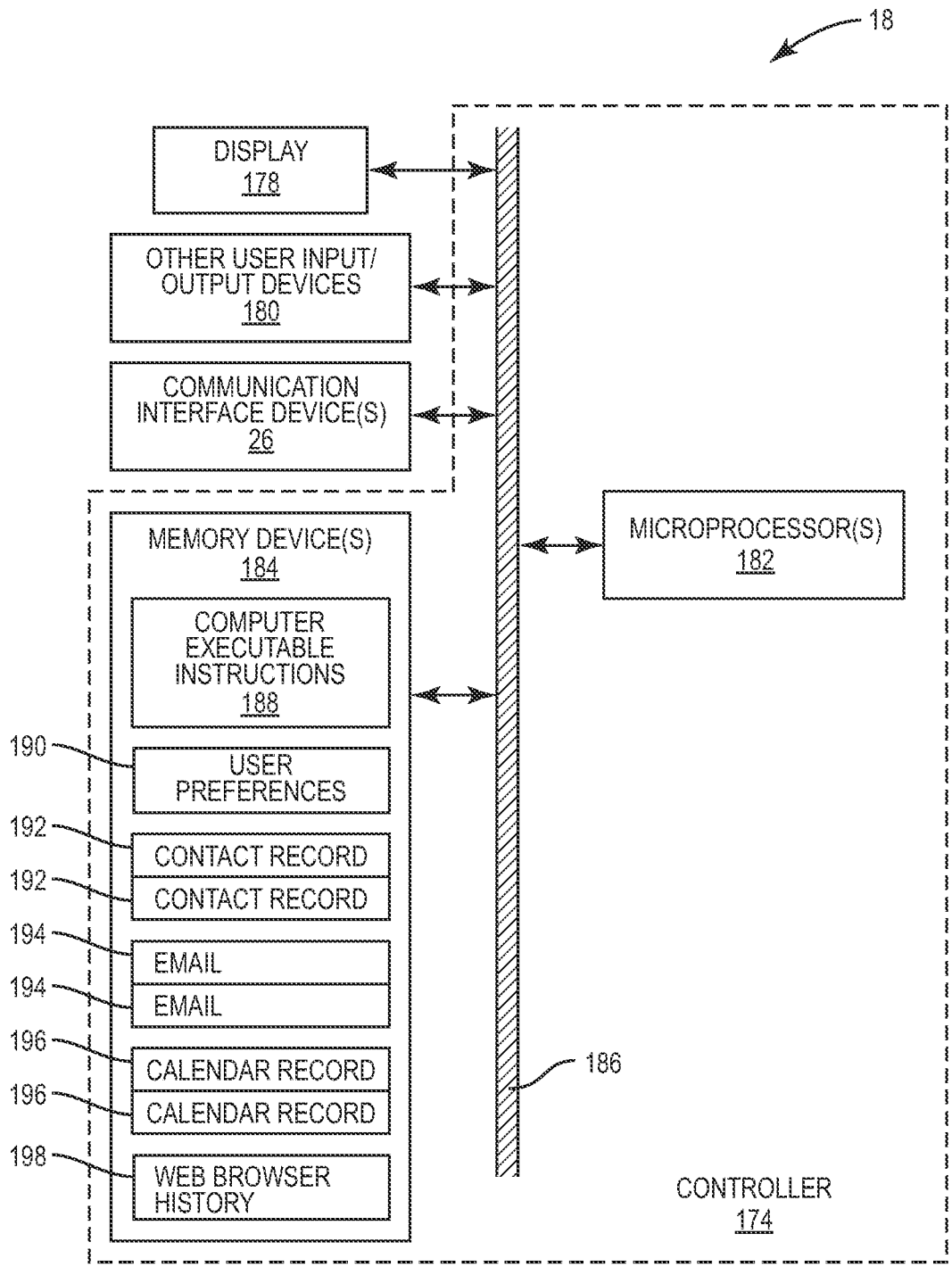
FIG. 15 illustrates one embodiment of the MCD shown in FIG. 1.

FIG. 15 illustrates one embodiment of the MCD 18. The MCD 18 includes a controller 174, a communication interface device 176, a display 178, and other user input and output devices 180. Communication interface device 176 is operable to communicatively couple the MCD 18 to the network 16 or to establish a wireless local area network link with the PND 20. Next, the controller 174 has general purpose computer hardware, in this case one or more microprocessors 182, a non-transitory computer readable medium, such as memory device 184, and a system bus 186. The system bus 186 is operably associated with the microprocessors 182 so that microprocessors 182 can exchange information with the communication interface device 176, the display 178, and other user input and output devices 180. Furthermore, the controller 174 may also include other hardware such as, control logic, other processing devices, additional non-transitory computer readable mediums, and the like. The memory device 184 may store computer executable instructions 188 for execution by the microprocessors 182. The computer executable instructions 188 configure the operation of the microprocessors 182 so that the microprocessors 182 implement the software applications for the PND 20 discussed above. The memory device 184 may also store personal information records. For example, the memory device 184, stores user preference data 190, contact records 192, emails 194, calendar records 196, and a web browser history 198. For example, the display 178 may be a touch screen, a monitor, an LCD display, a plasma display, and/or the like. The other user input and output devices 180 may be a keyboard, a microphone, a head-set, a mouse, and/or an input button, and may depend on the particular configuration of the MCD 18.

Those skilled in the art will recognize improvements and modifications to the preferred embodiments of the present disclosure. All such improvements and modifications are considered within the scope of the concepts disclosed herein and the claims that follow.

What is claimed is:

1. A personal navigation device comprising:
   at least one communication interface device operable to provide an interface for communications with a destination source device and to provide a wireless local area networking service; and
   a controller operably associated with the at least one communication interface device and configured to:
      obtain travel data that includes location data that indicates a location of the personal navigation device and direction data that indicates a direction of travel of the personal navigation device;
      transmit a destination request to the destination source device from the personal navigation device over a wireless network link established via the at least one communication interface device, the destination request comprising a request for a search of personal information records on the destination source device; and
      receive a response to the destination request over the wireless network link wherein the response comprises location data for each of one or more destinations based on the search of personal information records;

when the one or more destinations are a plurality of destinations such that there is location data for each of the plurality of destinations, for each of the plurality of destinations, calculating a probability value that the destination is a travel destination for a travel session wherein the probability value is based on the travel data and the location data indicating the destination and is further a function of a weight assigned to a record type of a record from which the location data that indicates the destination was obtained, wherein in calculating the probability value, the controller is configured to calculate the probability value by calculating a displacement distance between the destination and the location of the personal navigation device;

calculating a displacement direction of the destination from the location of the personal navigation device; and calculating the probability value of the destination as a function of the displacement distance and an angular displacement between the direction of travel of the personal navigation device and the displacement direction.

2. The personal navigation device of claim 1, wherein the travel data includes speed data indicating a speed of the personal navigation device in the direction of travel and wherein for each destination of the plurality of destinations, calculating the probability value of the destination is further a function of the speed.

3. A personal navigation device comprising:
at least one communication interface device operable to provide an interface for communications with a destination source device; and
a controller operably associated with the at least one communication interface device and configured to:
generate a destination request so that the destination request includes location data indicating a location of the personal navigation device and is requesting that the destination source device search personal information records comprising emails associated with a user so that the destination source device searches the emails based on the location data indicating the location of the personal navigation device;
transmit the destination request to the destination source device from the personal navigation device over a wireless network link established via the at least one communication interface device; and
receive a response to the destination request over the wireless network link wherein the response comprises location data for each of one or more destinations and the location data for at least one of the one or more destinations is from the emails.

4. A navigation device comprising:
at least one communication interface device operable to provide an interface for communications with a destination source device; and
a controller operably associated with the at least one communication interface device and configured to:
generate a destination request so that the destination request is requesting that the destination source device search personal information records associated with a user comprising a web browser history of the user;
transmit the destination request to the destination source device from the personal navigation device over a wireless network link established via the at least one communication interface device; and
receive a response to the destination request over the wireless network link wherein the response comprises location data for each of one or more destinations and such that the location data for at least one of the one or more destinations is from the web browser history.

5. The personal navigation device of claim 4 wherein the location data for each of the one or more destinations comprises one or more of a group consisting of address data and location position data.

6. The personal navigation device of claim 5 wherein the location position data consists of global position system (GPS) location data.

7. The personal navigation device of claim 4, wherein the controller is further configured to:
present a visual selection indicator that represents at least one of the one or more destinations;
receive input that the visual selection indicator has been selected; and
initiate a travel session with the personal navigation device where the one of the one or more destinations is a travel destination of the travel session.

8. The personal navigation device of claim 4 wherein the at least one communication interface device is operable to provide a wireless local area networking service.

9. The personal navigation device of claim 8, the controller is further configured to:
obtaining travel data that includes location data that indicates a location of the personal navigation device and direction data that indicates a direction of travel of the personal navigation device; and
when the one or more destinations are a plurality of destinations such that there is location data for each of the plurality of destinations, for each of the plurality of destinations, calculating a probability value that the destination is a travel destination for a travel session wherein the probability value is based on the travel data and the location data indicating the destination.

10. The personal navigation device of claim 9, for each destination of the plurality of destinations, the controller is configured to calculate the probability value by:
calculating a displacement distance between the destination and the location of the personal navigation device;
calculating a displacement direction of the destination from the location of the personal navigation device; and
calculating the probability value of the destination as a function of the displacement distance and an angular displacement between the direction of travel of the personal navigation device and the displacement direction.

11. The personal navigation device of claim 9, wherein the controller is further configured to present a visual selection indicator, wherein the visual selection indicator represents one of the plurality of destinations that has a greatest probability value of the probability values for the plurality of destinations.

12. The personal navigation device of claim 9, wherein the controller is further configured to present a plurality of visual selection indicators, wherein each of the plurality of visual selection indicators represents a corresponding destination of the plurality of destinations.

13. The personal navigation device of claim 12, wherein the controller is further configured to present the plurality of visual selection indicators in a ranked order, in accordance with the probability values for the plurality of destinations.

14. The personal navigation device of claim 12, wherein the controller is further configured to:

receive an input indicating that one of the plurality of visual selection indicators has been selected; and in response to the input, initiate a travel session having the corresponding destination of plurality of destinations for the selected visual selection indicator as the travel destination for the travel session.

15. The personal navigation device of claim 4, wherein a mobile communications device is configured to relay requests and responses between the personal navigation device and the destination source device and the at least one communication interface device is operable to connect to the personal navigation device to the mobile communications device through the wireless network link such that the wireless network link is a wireless local area network link between the personal navigation device and the mobile communications device.

16. The personal navigation device of claim 15, wherein the personal information records on the mobile communications device are personal information records associated with a user of the mobile communications device and the mobile communications device stores the personal information records associated with the user of the mobile communications device and the controller is further configured to:

generate the destination request so that the destination request is requesting a search of the personal information records by the mobile communications device prior to the mobile communications device transmitting the destination request to the destination source device; and receive the response such that the location data of at least one of the one or more destinations is from the personal information records.

17. The personal navigation device of claim 16, wherein the personal information records comprise one or more of a group consisting of: calendar records associated with the user, contact records associated with the user, emails associated with the user, and a web browser history associated with the user.

18. The personal navigation device of 15 wherein the controller is further configured to:

detect the mobile communications device using a wireless local area network service provided by the personal navigation device prior to transmitting the destination request; and establish the wireless local area network link between the personal navigation device and the mobile communications device.

19. The personal navigation device of claim 15, wherein the controller is further configured to:

generate the destination request so that the destination request is requesting user input from the mobile communications device indicating the one or more destinations prior to transmitting the destination request to the destination source device; and receive the response to the destination request as the user input.

20. The personal navigation device of claim 15, wherein the mobile communications device stores a communal transportation record indicating at least one destination utilized by a user when soliciting communal transportation and controller is further configured to:

generate the destination request so that the destination request is requesting the communal transportation record from the mobile communications device prior to transmitting the destination request to the destination source device; and receive the response to the destination request as the communal transportation record wherein the one or more destinations comprise the at least one destination utilized by a user when soliciting communal transportation.

21. The personal navigation device of claim 4, wherein a server computer is the destination source device, the server computer being communicatively associated with a mobile communications network and the at least one communication interface device is operable to connect the personal navigation device to the mobile communications device through the wireless network link such that the wireless network link is between the personal navigation device and the mobile communications network.

22. The personal navigation device of claim 21, wherein the server computer manages a user account associated with a user, the controller is further configured to:

generate the destination request so that the destination request is requesting a search of the user account by the server computer; and receive the response such that the location data of at least one of the one or more destinations is from the user account.

23. The personal navigation device of claim 22, wherein one or more personal information records are stored under the user account and the destination request is requesting that the search be of the personal information records.

24. The personal navigation device of claim 23 wherein the personal information records are one or more of a group consisting of: calendar records associated with the user, contact records associated with the user, emails associated with the user, and a web browser history associated with the user.

25. The personal navigation device of claim 4, wherein the controller is further configured to, prior to transmitting the destination request, generate the destination request so that the destination request is requesting that the destination source device search personal information records associated with a user.

26. The personal navigation device of claim 25, wherein the personal information records comprise calendar records associated with the user and the controller is further configured to:

generate the destination request so that the destination source device searches the calendar records based on one or more times of interest; and receive the response such that the location data of at least one of the one or more destinations is from the calendar records.

27. A personal navigation device comprising:

at least one communication interface device operable to provide an interface for communications with a destination source device; and a controller operably associated with the at least one communication interface device and configured to:

generate a destination request so that the destination request includes location data indicating a location of the personal navigation device and is requesting that the destination source device search personal information records comprising contact records associated with a user, the search based on the location data indicating the location of the personal navigation device;

transmit the destination request to the destination source device from the personal navigation device over a wireless network link established via the at least one communication interface device; and receive a response to the destination request over the wireless network link wherein the response comprises location data for each of one or more destinations and such that the location data for at least one of the one or more destinations is from the contact records.

28. A method of operating a personal navigation device, comprising:

transmitting a destination request to a destination source device from the personal navigation device over a wireless network link, the destination request comprising a request for a search of personal information records on the destination source device, the personal information records associated with a user comprising a web browser history of the user; and receiving a response to the destination request over the wireless network link wherein the response comprises location data for each of one or more destinations based on the search of personal information records such that the location data for at least one of the one or more destinations is from the web browser history.

29. The method of claim 28 wherein the one or more destinations are a plurality of destinations such that the location data for each of the one or more destinations is for the plurality of destinations.

30. The method of claim 29, wherein the method further comprises:

obtaining travel data that includes location data that indicates a location of the personal navigation device and direction data that indicates a direction of travel of the personal navigation device; and for each destination of the plurality of destinations, calculating a probability value that the destination is a travel destination wherein the probability value is based on the travel data and the location data indicating the destination.

31. The method of claim 28, wherein the destination source device is a mobile communications device and the wireless network link is a wireless local area network link between the personal navigation device and the mobile communications device.

32. The method of claim 28, wherein the destination source device is a server computer that is communicatively associated with a mobile communications network and the wireless network link is between the personal navigation device and the mobile communications network.

33. A non-transitory computer readable medium that includes computer executable instructions for instructing at least one microprocessor to perform a method, wherein the method comprises:

transmitting a destination request to a destination source device from a personal navigation device over a wireless network link, the destination request comprising a request for a search of personal information records on the destination source device, the personal information records associated with a user comprising a web browser history of the user; and receiving a response to the destination request over the wireless network link wherein the response comprises location data for each of one or more destinations based on the search of personal information records such that the location data for at least one of the one or more destinations is from the web browser history.

\* \* \* \* \*